United States Patent
Chen et al.

(10) Patent No.: US 10,091,766 B2
(45) Date of Patent: Oct. 2, 2018

(54) INTERFERENCE CANCELLATION/SUPPRESSION IN TDD WIRELESS COMMUNICATIONS SYSTEMS

(71) Applicant: QUALCOMM Incorporated, San Diego, CA (US)

(72) Inventors: Wanshi Chen, San Diego, CA (US); Tao Luo, San Diego, CA (US); Hao Xu, San Diego, CA (US); Peter Gaal, San Diego, CA (US); Taesang Yoo, San Diego, CA (US); Yongbin Wei, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/230,464

(22) Filed: Mar. 31, 2014

(65) Prior Publication Data

US 2014/0301251 A1    Oct. 9, 2014

Related U.S. Application Data

(60) Provisional application No. 61/809,078, filed on Apr. 5, 2013.

(51) Int. Cl.
*H04W 72/02* (2009.01)
*H04W 72/08* (2009.01)
(Continued)

(52) U.S. Cl.
CPC ........... *H04W 72/02* (2013.01); *H04J 11/005* (2013.01); *H04L 5/003* (2013.01); *H04W 72/082* (2013.01)

(58) Field of Classification Search
CPC ........ H04L 5/14; H04L 5/0073; H04W 72/02; H04W 72/08
(Continued)

(56) References Cited

U.S. PATENT DOCUMENTS

| 2009/0227263 | A1* | 9/2009 | Agrawal | ............... | H04W 16/16 |
| | | | | | 455/452.1 |
| 2010/0029213 | A1* | 2/2010 | Wang | ................. | H04B 1/71072 |
| | | | | | 455/63.1 |

(Continued)

FOREIGN PATENT DOCUMENTS

| CA | 2823145 A1 | 7/2012 |
| EP | 2445260 A1 | 4/2012 |

(Continued)

OTHER PUBLICATIONS

ISA/EPO, International Search Report and Written Opinion of the International Searching Authority, Int'l App. No. PCT/US2014/032454, dated Jul. 3, 2014, European Patent Office, Rijswijk, NL, 10 pgs.

(Continued)

*Primary Examiner* — Phong La
(74) *Attorney, Agent, or Firm* — Holland & Hart LLP

(57) ABSTRACT

A wireless user equipment (UE) may receive a downlink transmission from a base station in a first subframe of a first subframe configuration, and determine that a neighboring base station is operating according to a second subframe configuration. The UE may modify interference operations for the downlink transmission in the first subframe based on the determination to account for the neighboring base station operating according to the different subframe configuration. Modifying interference operations may include, for example, skipping interference operations, applying different interference operations to a subframe or a portion of a subframe, or a combination thereof. Modifying interference
(Continued)

operations may be based on one or more characteristics of the neighboring base station communications.

28 Claims, 15 Drawing Sheets

(51) Int. Cl.
*H04J 11/00* (2006.01)
*H04L 5/00* (2006.01)

(58) Field of Classification Search
USPC ............................................. 370/278
See application file for complete search history.

(56) References Cited

U.S. PATENT DOCUMENTS

| | | | | |
|---|---|---|---|---|
| 2010/0080323 A1* | 4/2010 | Mueck | ............... | H04J 11/0033 375/296 |
| 2011/0235601 A1* | 9/2011 | Yoo | ............... | H04L 5/0053 370/329 |
| 2011/0250919 A1* | 10/2011 | Barbieri | ............... | H04L 1/0026 455/509 |
| 2012/0014482 A1* | 1/2012 | Yu | ............... | H04L 25/03331 375/341 |
| 2012/0044818 A1* | 2/2012 | Lindoff | ............... | H04L 1/0036 370/252 |
| 2012/0082038 A1* | 4/2012 | Xu | ............... | H04J 11/0023 370/244 |
| 2012/0082070 A1* | 4/2012 | Hart | ............... | H04J 11/0023 370/280 |
| 2012/0099462 A1* | 4/2012 | Yuda | ............... | H04W 24/10 370/252 |
| 2012/0140657 A1* | 6/2012 | Wigren | ............... | H04L 25/0212 370/252 |
| 2012/0294229 A1* | 11/2012 | Saito | ............... | H04W 72/082 370/315 |
| 2013/0044704 A1* | 2/2013 | Pang | ............... | H04W 72/0426 370/329 |
| 2013/0107705 A1* | 5/2013 | Dinan | ............... | H04W 72/0446 370/230 |
| 2013/0157709 A1* | 6/2013 | Ji | ............... | H04W 52/04 455/522 |
| 2013/0201884 A1* | 8/2013 | Freda | ............... | H04W 72/005 370/278 |
| 2013/0223258 A1* | 8/2013 | Seo | ............... | H04W 24/02 370/252 |
| 2013/0225188 A1* | 8/2013 | Seo | ............... | H04J 11/005 455/450 |
| 2013/0272170 A1 | 10/2013 | Chatterjee et al. | | |
| 2013/0295949 A1* | 11/2013 | Seo | ............... | H04J 11/005 455/452.1 |
| 2013/0331137 A1* | 12/2013 | Burchill | ............... | H04W 52/243 455/501 |
| 2014/0177486 A1* | 6/2014 | Wang | ............... | H04L 5/0053 370/280 |
| 2014/0233466 A1* | 8/2014 | Pourahmadi | ............... | H04L 5/0051 370/329 |
| 2014/0307729 A1* | 10/2014 | Son | ............... | H04J 11/0056 370/350 |
| 2015/0085782 A1* | 3/2015 | Seo | ............... | H04L 1/1861 370/329 |
| 2015/0103683 A1* | 4/2015 | Kim | ............... | H04W 24/02 370/252 |
| 2015/0139018 A1* | 5/2015 | Dinan | ............... | H04B 7/2656 370/252 |
| 2015/0146687 A1* | 5/2015 | Kim | ............... | H04W 76/023 370/331 |
| 2015/0163719 A1* | 6/2015 | Lim | ............... | H04W 36/38 455/438 |
| 2015/0163760 A1* | 6/2015 | Wu | ............... | H04W 56/002 370/336 |
| 2015/0200762 A1* | 7/2015 | Kim | ............... | H04L 1/1867 370/329 |
| 2015/0256280 A1* | 9/2015 | Park | ............... | H04J 11/005 370/329 |
| 2015/0264676 A1* | 9/2015 | Suzuki | ............... | H04L 1/00 370/329 |

FOREIGN PATENT DOCUMENTS

| | | |
|---|---|---|
| JP | 2011512077 A | 4/2011 |
| WO | WO-2009095369 A1 | 8/2009 |
| WO | WO-2011103476 A1 | 8/2011 |
| WO | WO-2011130450 A1 | 10/2011 |

OTHER PUBLICATIONS

LG Electronics: "Remaining Issues in feICIC WI", 3GPP TSG-RAN WG1#70bis, 3GPP, Oct. 12, 2012, R1-124315, pp. 1-4, URL: http://www.3gpp.org/ftp/tsg_ran/WG1_RL1/TSGR1_70b/DocsiR1-124315.zip.

RAN1: "LS on feICIC", 3GPP TSG-RAN WG1#68bis, 3GPP, Mar. 30, 2012, R1-121920, 1 Page, URL: http://www.3gpp.org/ftp/tsg_ran/WG1_RL1/TSGR1_68b/Docs/R1-121920.zip.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

INTERFERENCE CANCELLATION/SUPPRESSION IN TDD WIRELESS COMMUNICATIONS SYSTEMS

CROSS REFERENCES

The present application for patent claims priority to U.S. Provisional Patent Application No. 61/809,078 by Wang et al., entitled "Interference Cancellation/Suppression in TDD Wireless Communications Systems," filed Apr. 5, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations that can support communication for a number of mobile devices. In some technologies, mobile devices may be called access terminals, user equipments (UEs), mobile stations, and the like. A mobile device may communicate with a base station via downlink (DL) and uplink (UL) transmissions. The downlink (or forward link) refers to the communication link from the base station to the mobile device, and the uplink (or reverse link) refers to the communication link from the mobile device to the base station. Each base station has a coverage range, which may be referred to as the coverage area of the cell.

In cellular deployments, a macrocell is used to describe a cell serving a wide region such as rural, suburban, and urban areas. Smaller cells may be deployed in homes, small businesses, buildings, or other limited regions. These small cells may be called "picocells" or "femtocells." Picocells and femtocells are often connected to a service provider's network via a broadband connection. In 3GPP terms, these cells may be referred to as Home NodeBs (HNB) for UMTS (WCDMA, or High Speed Packet Access (HSPA)) and Home eNodeBs (HeNB) for LTE/LTE-A networks. Some small cells provide access by UEs having an association with the cell, and in some deployments one or more clusters of small cells may provide access by UEs within specific particular areas or buildings (e.g., parks, shopping malls, etc.). Some small cells may be restricted access cells, sometimes referred to as closed subscriber group (CSG) cells. Cells (e.g., macrocells, picocells, femtocells, etc.) that provide access to UEs associated with one or more provider networks without a specific association between the UE and the cell may be called open access cells.

While small cells typically transmit at lower power than macrocells, signals from a small cell may be received at a UE with relatively high signal strength compared to signals received from the macrocell. For example, where a UE is located near a cell edge for a macrocell but relatively close to a remote radio head (RRH) of a small cell, the small cell signals received at the UE may be as strong or even stronger than the signals received from the macrocell. In instances where the UE is communicating with the macrocell and not the small cell, the UE may have difficulty finding and decoding the appropriate signals from the macrocell for establishing a communication link with the macrocell due to interference from the small cell signals. Similarly, signals from a macrocell may be received at a UE with relatively high strength relative to signals from a small cell. In some such instances, it may be desirable for the UE to establish communications with the small cell and the UE may have difficulty finding and decoding the appropriate signals from the small cell for establishing a communication link with the small cell due to interference from the macrocell signals.

SUMMARY

The present disclosure generally relates to one or more improved methods, systems, and/or apparatuses for managing interference at a user equipment (UE). A UE may, for example, receive from a base station a first subframe of a first subframe configuration, and determine that a neighboring base station is operating according to a second subframe configuration. The UE may modify interference management operations for the first subframe based on the determination to account for the neighboring base station operating according to the different subframe configuration. In some examples, modifying interference management operations may include, for example, at least partly skipping the interference management operations during at least a portion of the first subframe, applying different interference cancellation/interference suppression (IC/IS) to a first subframe or a portion of a subframe, or a combination thereof. Modifying IC/IS may be based on one or more characteristics of the neighboring base station communications.

In accordance with a first set of illustrative embodiment, a method for wireless communications performed by a UE is provided. The method generally includes receiving from a base station a first subframe of a first subframe configuration. The UE may determine whether a neighboring base station is operating according to a second subframe configuration during the first subframe. The first and second subframe configurations may be different. The method may further comprise modifying interference management operations for the first subframe based on the determination.

In some examples, modifying the interference management operations may comprise at least partly skipping the interference management operations during at least a portion of the first subframe. In some examples information may be received from the base station identifying at least a portion of one or more subframes in which the interference management operations are to be at least partly skipped. The first and second subframe configurations may be one of a downlink subframe, uplink subframe or a special subframe.

In some examples, the method may further comprise receiving information from the base station identifying at least a portion of one or more subframes in which the interference management operations are to be at least partly skipped. The information may comprise indication of a time-division duplex (TDD) uplink/downlink (UL/DL) configuration for the neighboring base station and a subset of subframes. The interference may be determined based on the TDD UL/DL configuration for the neighboring base station. transmission.

In some examples, determining whether at least one neighboring base station is operating according to a second subframe configuration during the first subframe comprises detecting whether the second subframe from the neighboring base station, that at least partly overlaps the first subframe, comprises one or more of a downlink transmission or an uplink. In yet further examples, the detecting may comprise receiving a reference signal of the neighboring base station and determining whether the second subframe for the neighboring base station comprises a downlink transmission and/or an uplink transmission based on information associated with the reference signal. Yet further, the second subframe configuration may be determined based on a resource block of the neighboring base station and an assumption that all transmitted subframes of the neighboring base station are consistent with the information in the resource block.

In yet further examples of the first illustrative embodiment, the method may comprise receiving from the base station a third subframe of a third subframe configuration, the third subframe comprising a first special subframe (SSF) and determining that the neighboring base station is operating according to a fourth subframe configuration during the third subframe. The method may further comprise modifying the interference management operations for the third subframe in response to the third subframe configuration being the same as the fourth subframe configuration. In some examples, modifying interference management operations may comprise at least partly skipping the interference management operations during at least a portion of the third subframe for the one or more SSF.

According to a second set of illustrative embodiments, a non-transitory computer-readable medium is described. The non-transitory computer-readable medium may include code for receiving from a base station a first subframe of a first subframe configuration. The code may include code for determining whether a neighboring base station is operating according to a second subframe configuration during the first subframe. The first and second subframe configurations may be different. The code may further comprise code for modifying interference management operations for the first subframe based on the determination. In certain examples, the computer-readable medium or code stored thereon may further implement one or more aspects of the method for managing wireless communications described above with respect to the first set of illustrative embodiments.

According to a third set of illustrative embodiments, a UE equipment device for wireless communication is described. The device may comprise a processor and a memory in electronic communication with the processor. The memory may further embody instructions executable by the processor to receive from a base station a first subframe of a first subframe configuration. The UE may determine whether a neighboring base station is operating according to a second subframe configuration during the first subframe. The first and second subframe configurations may be different. The instructions may further comprise modifying interference management operations for the first subframe based on the determination. In certain examples, the UE equipment device may further implement one or more aspects of the method for managing wireless communications described above with respect to the first set of illustrative embodiments.

According to a fourth set of illustrative embodiments, a method for wireless communication performed by a base station is described. The method may comprise identifying a first subframe configuration for a first subframe associated with at least one UE and determining that a neighboring base station is operating according to a second subframe configuration during the first subframe that is different from the first subframe configuration. The method may further comprise modifying interference management operations for the first subframe based on the determination.

In some examples, modifying interference management operations comprises transmitting information to the UE identifying the first subframe for interference management modification. The information may comprise a bitmap identifying a subset of subframes. The modifying interference management operations may comprise at least partly skipping the interference management operations during at least a portion of the first subframe.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
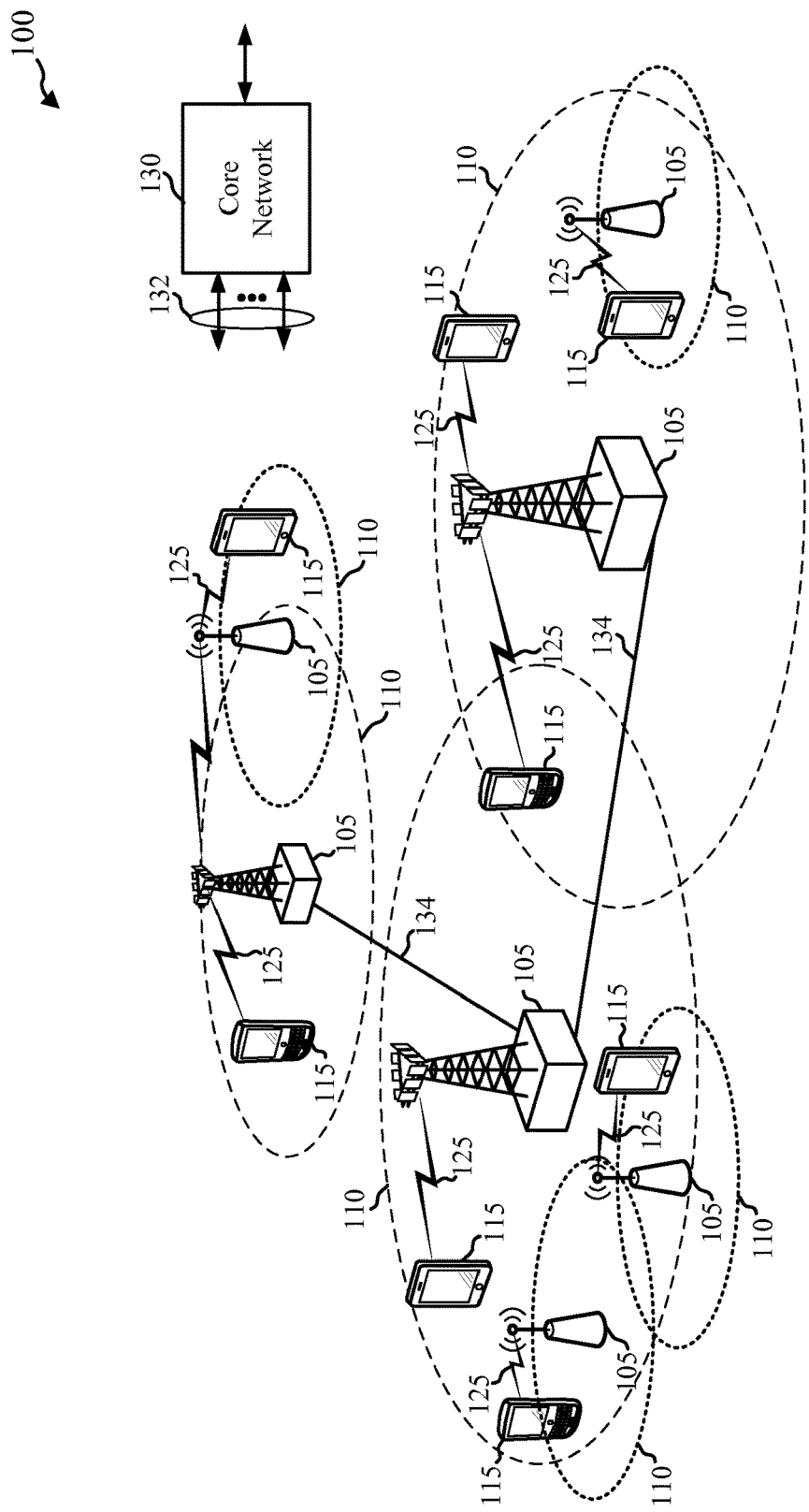
FIG. 1 is a diagram illustrating an example of a wireless communications system in accordance with various embodiments.

Various aspects of the disclosure provide for Interference management operations. The interference management operations may, for example, include interference cancellation/interference suppression (IC/IS) of neighbor cell transmissions. A UE may, for example, receive a downlink transmission from a base station in a first subframe of a first subframe configuration, and determine that a neighboring base station is operating according to a second subframe configuration. The UE may modify IC/IS operations for the downlink transmission in the first subframe based on the determination to account for the neighboring base station operating according to the different subframe configuration. Modifying IC/IS operations may include, for example, skipping IC/IS operations, applying different IC/IS to a subframe or a portion of a subframe, or a combination thereof. Modifying IC/IS may be based on one or more characteristics of the neighboring base station communications.

In some embodiments, a UE may modify IC/IS operations associated with one or more subframes transmitted in time-division duplex (TDD) communications. Such IC/IS modification may be based on, for example, a TDD uplink/downlink (UL/DL) configuration for the neighboring base station. The TDD UL/DL configuration for the neighboring base station may be different from a TDD UL/DL configuration of the UE and its serving base station. In some embodiments, the TDD UL/DL configuration of the serving and/or neighboring base station may be adaptive, and change relatively frequently. In such cases, a subset of subframes containing UL interference may be determined based on the particular TDD UL/DL configurations for the neighboring base station and serving base station. In other embodiments, a UE may modify IC/IS operations associated with one or more special subframes transmitted in time-division duplex (TDD) communications. Such IC/IS modification may be based on, for example, differing uplink and downlink portions of the special subframes between the serving and neighboring base stations.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes base stations (or cells) 105, user equipments (UEs) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. Backhaul links may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. In embodiments, some eNBs 105 may be synchronous while other eNBs may be asynchronous.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. In various embodiments, the communication links 125 are TDD carriers carrying bidirectional traffic within traffic frames.

In embodiments, the wireless communications system 100 is an LTE/LTE-A network. In LTE/LTE-A networks, the term evolved Node B (eNB) may be generally used to describe the base stations 105. The wireless communications system 100 may be a Heterogeneous LTE/LTE-A network in which different types of eNBs provide coverage for various geographical regions. For example, each eNB 105 may provide communication coverage for a macro cell, a small cell (e.g., a pico cell or a femto cell), and/or other types of cell. A macro cell generally covers a relatively large geographic area (e.g., several kilometers in radius) and may allow unrestricted access by UEs with service subscriptions with the network provider. A small cell would generally cover a relatively smaller geographic area and may allow unrestricted access by UEs or restricted access to UEs (e.g., UEs in a closed subscriber group (CSG), UEs for users in a home, and the like). In some embodiments, small cells may be configured in clusters to cover a particular geographic area or building. An eNB for a macro cell may be referred to as a macro eNB. An eNB for a small cell may be referred to as a remote radio head (RRH), a pico eNB, a femto eNB or a home eNB, for example. An eNB may support one or multiple (e.g., two, three, four, and the like) cells.

The wireless communications system 100 according to an LTE/LTE-A network architecture may be referred to as an Evolved Packet System (EPS) 100. The wireless communications system 100 may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, the wireless communications system 100 may interconnect with a UTRAN-based network and/or a CDMA-based network via one or more Serving GPRS Support Nodes (SGSNs). To support mobility of UEs 115 and/or load balancing, wireless communications system 100 may support handover of UEs 115 between a source eNB 105 and a target eNB 105. The wireless communications system 100 may support intra-RAT handover between eNBs 105 and/or base stations of the same RAT (e.g., other E-UTRAN networks), and inter-RAT handovers between eNBs and/or base stations of different RATs (e.g., E-UTRAN to CDMA, etc.). The wireless communications system 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface). The eNBs 105 may provide an access point to the core network 130 for the UEs 115. The eNBs 105 may be connected by backhaul link 132 (e.g., an S1 interface) to the core network 130. Logical nodes within the core network 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115. A coordination area for CoMP may include, for example, homogeneous deployments that utilize intra-eNB CoMP or inter-eNB CoMP. Various deployments that use inter-eNB CoMP may utilize a service eNB and one or more remote radio heads (RRHs) located within a coordination area. Heterogeneous CoMP deployments may also be utilized, in which a macro cell and one or more RRHs (e.g., small cell base station) may form a CoMP coordination area. Such small cell RRHs and macro cell may be configured with different physical layer cell identifiers (PCIs), or may be configured with the same PCI and have a common physical downlink control channel (PDCCH) control region.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The wireless communications system 100 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

The carriers may transmit bidirectional communications FDD (e.g., paired spectrum resources), TDD (e.g., unpaired spectrum resources). Frame structures for FDD (e.g., frame structure type 1) and TDD (e.g., frame structure type 2) may be defined. Each frame structure may have a radio frame length $T_f=307200 \cdot T_s=10$ ms and may include two half-frames of length $153600 \cdot T_s=5$ ms each. Each half-frame may include five subframes of length $30720 \cdot T_s=1$ ms.

For TDD frame structures, each subframe may carry UL or DL traffic, and special subframes ("S") may be used to switch between DL to UL transmission. Allocation of UL and DL subframes within radio frames may be symmetric or asymmetric and may be reconfigured semi-statically (e.g., RRC messages via backhaul, etc.). Special subframes may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. UL/DL configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame. For LTE/LTE-A, seven different UL/DL configurations are defined that provide between 40% and 90% DL subframes as illustrated in table FIG. 2 at Table 200. As indicated in table 200, there are two switching periodicities, 5 ms and 10 ms. For configurations with 5 ms switching periodicities, there are two special subframes per frame, and for configurations with 10 ms switching periodicities there is one special subframe per frame. Some of these configurations are symmetric, having the same number of uplink and downlink slots, while some are asymmetric, having different numbers of uplink and downlink slots. For example, UL/DL configuration 1 is symmetric, with four uplink and four downlink subframes, UL/DL configuration 5 favors downlink throughput, and UL/DL configuration 0 favors uplink throughput.

The particular TDD UL/DL configuration that is used by a base station may be based on user requirements for the particular coverage area. For example, with reference again to FIG. 1, if a relatively large number of users in a geographic coverage area 110 are receiving more data than they are transmitting, the UL/DL configuration for the associated base station 105 may be selected to favor downlink throughput. Similarly, if a relatively large number of users in a coverage are 110 are transmitting more data than they are receiving, the UL/DL configuration for the associated base station 105 may be selected to favor uplink throughput and the base station 105 may operate using UL/DL configuration 0. In some aspects, a base station 105 may be able to reconfigure TDD UL/DL configurations dynamically, e.g., on a frame-by-frame basis, such as, for example, according to enhanced Interference Management and Traffic Adaptation (eIMTA) techniques. In such cases, UEs 115 that are reconfigured may receive the reconfiguration message, and transmit/receive subframes on subsequent TDD frames using the reconfigured UL/DL configuration. Such capabilities allow for relatively fast switching for the reconfigured UEs 115 according to the instantaneous traffic situation, and may provide enhanced packet throughput between the UEs 115 and base station 105. A UE 115, for example, may be in communication with a base station 105 using an initial TDD UL/DL configuration. This initial TDD UL/DL configuration, however, may become unfavorable for efficient packet throughput at a later point in time. For example, the user may switch from receiving a relatively large amount of data to transmitting a relatively large amount of data. In such a situation, a ratio of uplink to downlink transmission data may have a significant change, which may result a previously favorable UL/DL configuration becoming an unfavorable UL/DL configuration. In situations where neighboring cells operate according to different TDD UL/DL configurations, additional interference may be present because of different uplink or downlink transmissions that may be occurring during a TDD subframe. Various embodiments provide techniques for modifying IC/IS operations at a UE based on potential differences in TDD UL/DL configurations used by neighboring cells of a same carrier frequency and/or of adjacent carrier frequency. Furthermore, in situations where a cell may dynamically alter the TDD UL/DL configuration of a UE, various embodiments provide techniques for dynamically modifying IC/IS operations at a UE based on TDD UL/DL reconfiguration.

Figures 2, 3:
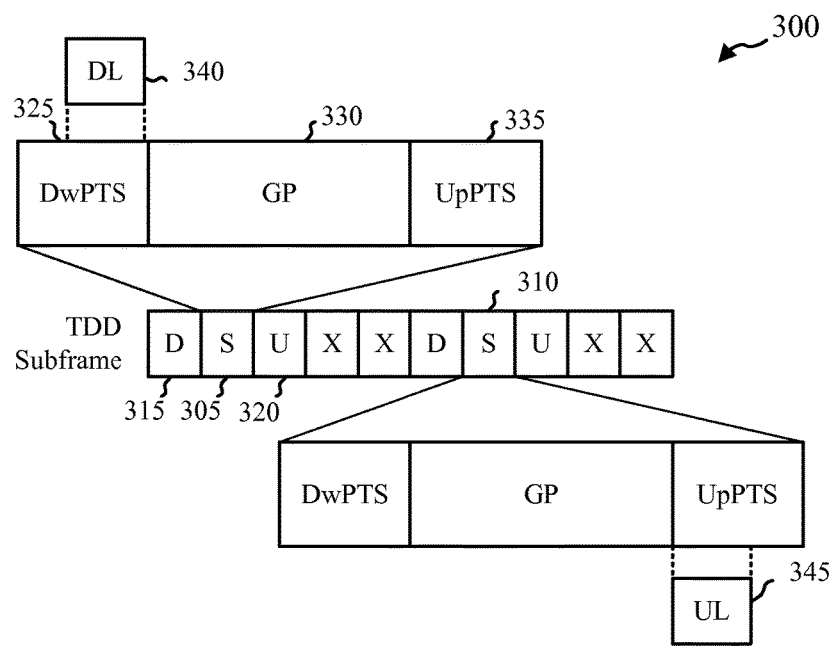
FIG. 2 is a table illustrating TDD Uplink-Downlink configurations in exemplary wireless communications system in accordance with various embodiments.
FIG. 3 is an illustration of special subframe configurations in exemplary wireless communications system in accordance with various embodiments.

As discussed above with respect to FIG. 2, each TDD UL/DL configuration includes one or two special subframes (SSFs). FIG. 3 illustrates a timing diagram 300 of a TDD frame and two SSFs 305 and 310. In timing diagram 300, downlink subframes 315 are indicated by a "D," uplink frames 320 are indicated by a "U," and SSFs 305 and 310 are indicated by an "S." An "X" in a frame indicates that the frame may be either downlink or uplink frames based on the particular TDD UL/DL configuration. SSFs 305 and 310 may include three fields, Downlink Pilot Time Slot (DwPTS) 325, Guard Period (GP) 330, and Uplink Pilot Time Slot (UpPTS) 335, downlink information may be transmitted during a portion of DwPTS 325, while uplink information may be transmitted during a port of UpPTS 335. Furthermore, in various embodiments, uplink or downlink information may be transmitted during a portion of one or more of SSFs 305, 310, with the example of FIG. 3 including a downlink transmission 340 in the DwPTS portion of SSF 305, and an uplink transmission 345 in the UpPTS portion of SSF 310. As will be recognized, the TDD UL/DL configuration illustrated in FIG. 3 may have a TDD period of 5 ms, or half of the frame period of 10 ms (e.g., TDD UL/DL configurations 0, 1, 2, 6). TDD configurations having a period of 10 ms include similar DwPTS, GP, and UpPTS portions.

Referring again to SSFs 305 and 310, as noted such SSFs may contain uplink transmissions 345 or downlink transmissions 340. Such transmissions 340, 345 may include, for example, preamble sequences transmitted for dynamic TDD UL/DL reconfiguration in a TDD frame. For example, downlink transmission 340 may include a TDD UL/DL reconfiguration message that may be sent as a preamble sequence within the DwPTS 325, and uplink transmission 345 may include a sounding reference signal (SRS) within the UpPTS 335. Where the TDD switch period is equal to the radio frame period, each TDD frame has only a single special subframe and, in some instances, both uplink and downlink information may be transmitted within the same special subframe. In situations where neighboring cells operate according to different TDD UL/DL configurations, additional interference may be present. Various embodiments provide techniques for modifying IC/IS operations at a UE based on potential differences in TDD UL/DL configuration. In situations where neighboring cells operate according to different TDD UL/DL configurations, the SSFs 305 and 310 may have different uplink and downlink characteristics for different portions of the SSFs 305 and 310. Such different uplink and downlink characteristics within these subframes may also result in additional interference from a neighboring cell. Various embodiments provide techniques for modifying IC/IS operations at a UE based on potential differences in UL/DL characteristics of SSFs. Furthermore, in situations where a cell may dynamically alter the TDD UL/DL configuration of a UE, thus changing UL/DL characteristics of SSFs, various embodiments provide techniques for dynamically modifying IC/IS operations at a UE based on TDD UL/DL reconfiguration.

Figure 4:
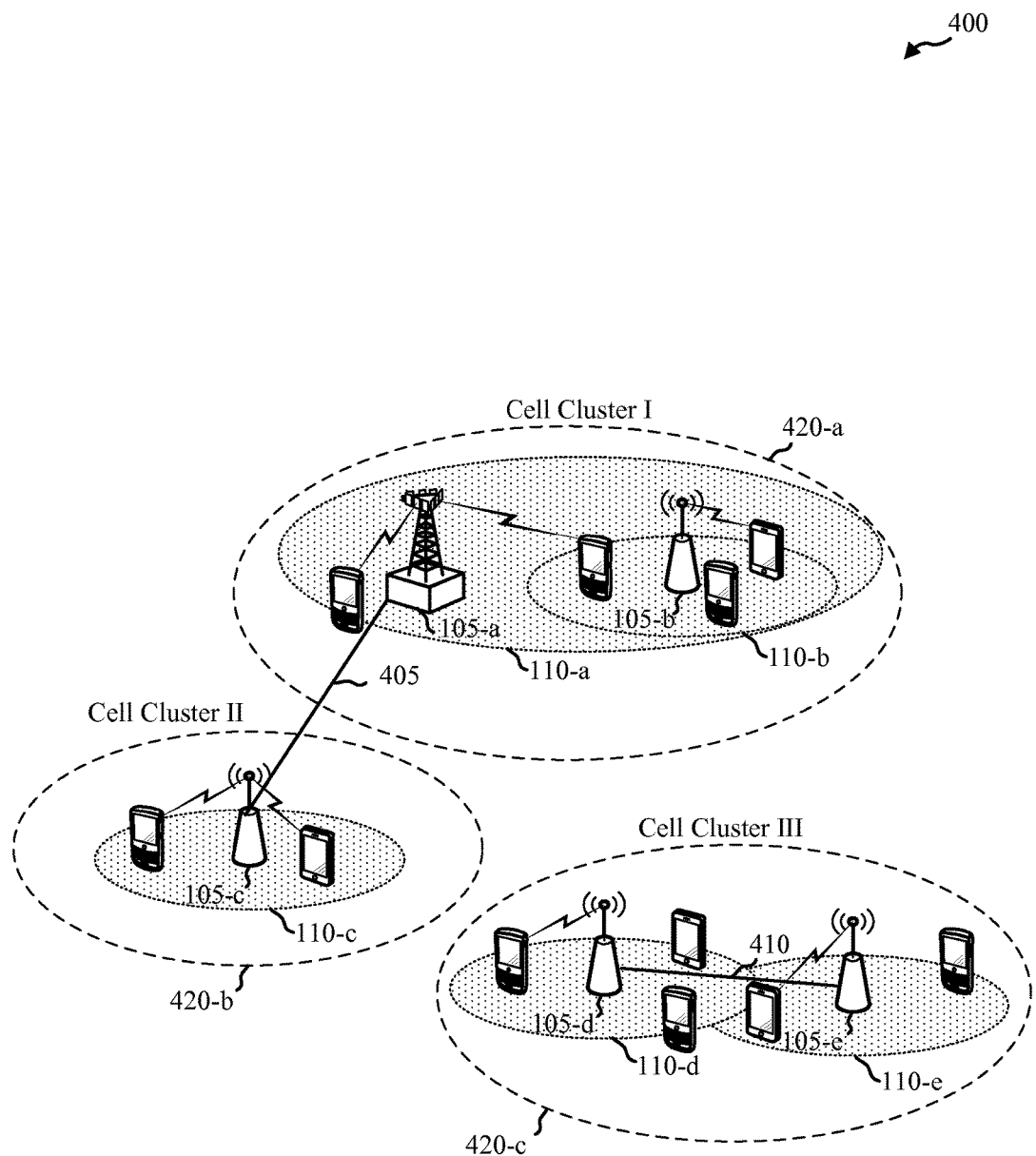
FIG. 4 illustrates an exemplary wireless communications system with cells grouped according to cell clusters in accordance with various embodiments.

FIG. 4 illustrates an exemplary network 400 with eNBs grouped according to cell clusters. Network 400 may illustrate, for example, aspects of wireless communications system 100 illustrated in FIG. 1. Cell clusters can include one or more eNBs, and eNBs within a cell cluster may be different types (e.g., macrocell and small cell). As illustrated in the example of FIG. 4, network 400 includes cell clusters 420-a, 420-b, and 420-c. Cell cluster 420-a may include a macrocell eNB 105-a and a small cell eNB 105-b, cell cluster 420-b may include small cell eNB 105-c, and cell cluster 420-c may include small cell eNBs 105-d and 105-e. Cell clusters 420 may be statically or semi-statically defined and each eNB 105 in a cluster 420 may be aware of the other eNBs 105 of its cluster. Cell clusters 420-a, 420-b, and/or 420-c may deploy TDD carriers and TDD UL/DL configuration within each cell cluster may be synchronized. In the example of FIG. 4, macrocell cluster 420-a may include a high powered eNB 105-a and a small cell remote radio head (RRH) 105-b that is located within the coverage area of eNB 105-a. Other small cell clusters 420-b and 420-c may be located outside of the coverage area of eNB 105-a. In some cases, small cells may be coupled with a macrocell, such as through backhaul link 405 between small cell eNB 105-c and macrocell eNB 105-a. In other cases, a small cell cluster, such as cluster 420-c, may not be coupled with a macrocell, and small cell eNBs 105-d and 105-e may me coupled through backhaul link 410.

Traffic adaptation for synchronized TDD UL/DL configuration within a cell cluster may be performed by coordination of TDD UL/DL reconfiguration between cells of the cluster. Semi-static (e.g., on the order of tens of frames) TDD UL/DL reconfiguration may be performed by exchange of control-plane messaging among eNBs (e.g., via S1 and/or X2 interfaces, etc.). In some aspects, rapidly changing traffic conditions may be accommodated through allowing the UL/DL configuration for a particular UE 115 to be reconfigured dynamically. Such dynamic reconfiguration may be transmitted to a UE 115 through signaling from the any eNBs 105, such as through control channel signaling, and apply to one or more subsequent TDD frames. Such reconfigurations may be accomplished according eIMTA, which may be implemented in some networks. In such networks, eIMTA compatible UEs may receive dynamic reconfiguration messages indicating that particular subframes within a TDD frame may be switched from an uplink to a downlink subframe. In some networks, the adaptation rate may be relatively fast, such as 10 ms, thus providing ability in some situations to change TDD UL/DL configurations on a frame-by-frame basis.

Figure 5:
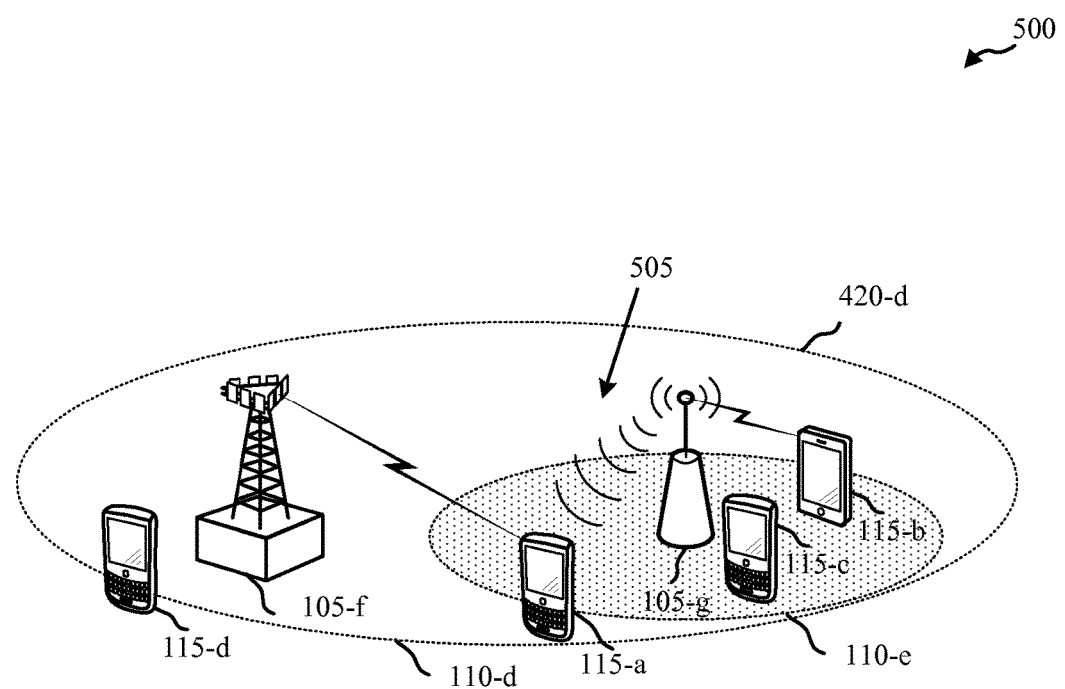
FIG. 5 illustrates exemplary cell clusters and potential interference between a UE and a neighboring cell in accordance with various embodiments.

However, as noted above, in situations where a UE may be communicating with a serving eNB, and one or more neighboring eNBs are operating according to different TDD UL/DL configurations, interference between the neighboring base station and serving base station may occur that may not be accounted for according to IC/IS techniques that may be employed by the UE. FIG. 5 illustrates an exemplary network 500 in which transmissions from a small cell base station 105-g may cause interference with communications between a macro cell base station 105-f and a UE 115-a. Network 500 may illustrate, for example, aspects of wireless communications system 100 illustrated in FIG. 1 and/or network 400 illustrated in FIG. 4. In this example, a macro cell base station 105-f may have geographic coverage area 110-d and serve UE 115-a and UE 115-d. Small cell base station 150-g may have geographic coverage area 110-e and serve UEs 115-b and 115-c. In this example, macro cell base station 105-f is in active communication with UE 115-a, and transmissions between base station 105-f and UE 115-a may include transmission of a first subframe having a first subframe configuration, such as an uplink or downlink subframe in a TDD UL/DL configuration, or a particular SSF configuration. Neighboring cell base station 105-g may be in active communication with UE 115-b, and transmissions between base station 105-g and UE 115-b may include transmission of a second subframe having a second subframe configuration, such as an uplink or downlink subframe in a TDD UL/DL configuration, or a particular SSF configuration.

In some cases, the second subframe configuration may be different from the first subframe configuration, and may result in interference, indicated at 505, that is received at UE 115-a. In some instances interference 505 from neighboring base station 105-g received at UE 115-a may be relatively strong (e.g., enough to cause inter-cell interference) or even stronger (e.g., higher signal to interference plus noise ratio (SINR), etc.) than transmissions from serving base station 105-f. For example, UE 115-a may be located close to neighboring base station 105-*g* and near the cell edge of the geographic coverage area 110-*d* of serving base station 105-*f*. In some cases, UE 115-*a* may have difficulty even finding signals from serving base station 105-*f* used to synchronize and decode transmissions. For example, UE 115-*a* may have difficulty detecting synchronization signals (e.g., primary synchronization signal (PSS), secondary synchronization signal (SSS), etc.) and/or channels carrying system information (e.g., PBCH, etc.) because of the interference 505.

UE 115-*a* may perform interference management operations according to established interference cancellation or interference suppression (IC/IS) operations that are initiated in connection with establishing communications with serving base station 105-*f*. In some embodiments, serving base station 105-*f* may transmit interference cancellation information used by UE 115-*a* in suppressing and/or cancelling the neighboring base station 105-*g* signals, and/or to detect and/or decode the neighboring base station 105-*g* signals. The serving base station 105-*f* may, for example, transmit information that indicates transmission power of the serving base station 105-*f* and/or neighboring base station 105-*g* signals (e.g., traffic-to-pilot power ratio, etc.), information that indicates how serving base station 105-*f* and/or neighboring base station 105-*g* signals are encoded (e.g., CSG cell virtual ID, etc.), and/or information relating to how serving base station 105-*f* and/or neighboring base station 105-*g* transmissions are allocated (e.g., CFI, etc.). In some embodiments, base stations 105-*f* and 105-*g* may operate according to a fixed set of parameters that can be used by UEs to suppress and/or cancel interfering signals. For example, base stations 105-*f* and 105-*g* may operate according to a fixed set of TPR values, a fixed set of virtual IDs, fixed CFI, etc. In some embodiments, the virtual cell ID for base stations 105-*f* and 105-*g* may follow a predetermined relationship with the physical cell ID of the serving base station 105-*f*.

In some examples, UE 115-*a* may receive interference management assistance information. The assistance information and/or interference cancellation information may be transmitted in system information messages that can be received by the UE 115-*a* prior to registration on the network or establishing an RRC connection. UE 115-*a* may receive interference cancellation information without registering or establishing an RRC connection with base station 105-*g*. For example, UE 115-*a* may use interference suppression (IS), minimum mean square error (MMSE) interference rejection, multi-user detection (MUD), joint maximum likelihood (ML) detection, symbol-level interference cancellation (SLIC), codeword-level interference cancellation (CWIC), and/or other interference cancellation techniques to suppress and/or cancel portions of the interference 505. In some embodiments, further interference cancellation information may allow UE 115-*a* to apply more advanced interference management techniques. For example, in SLIC the most likely transmitted bits are estimated for each symbol independently without taking into account the coding scheme used to encode the transmission. UE 115-*a* may be able to use interference cancellation information to apply CWIC by taking into account the coding scheme used by base station 105-*g* to encode transmissions (e.g., PBCH, PDSCH, PDCCH, etc.). In some cases, the reconstructed interfering signal may be more reliable using CWIC which may produce improved cancellation of the interference 505.

In the case of changed or reconfigured communications between neighboring base station 105-*g* and UE 115-*b*, interference 505 may be different from the interference accounted for in any previous IC/IS information used by UE 115-*a*. According to various embodiments, the UE 115-*a* may modify interference management operations for the first subframe based on a determination of the different second subframe configuration of the neighboring base station 105-*g*. For example, the second subframe configuration may have previously included a downlink transmission that is changed to an uplink transmission in the second subframe configuration. The UE 115-*a* may modify interference operations to account for such a second subframe configuration of the neighboring base station 105-*g*. In some examples, modifying interference management operations may comprise modifying IC/IS operations.

Figure 6:
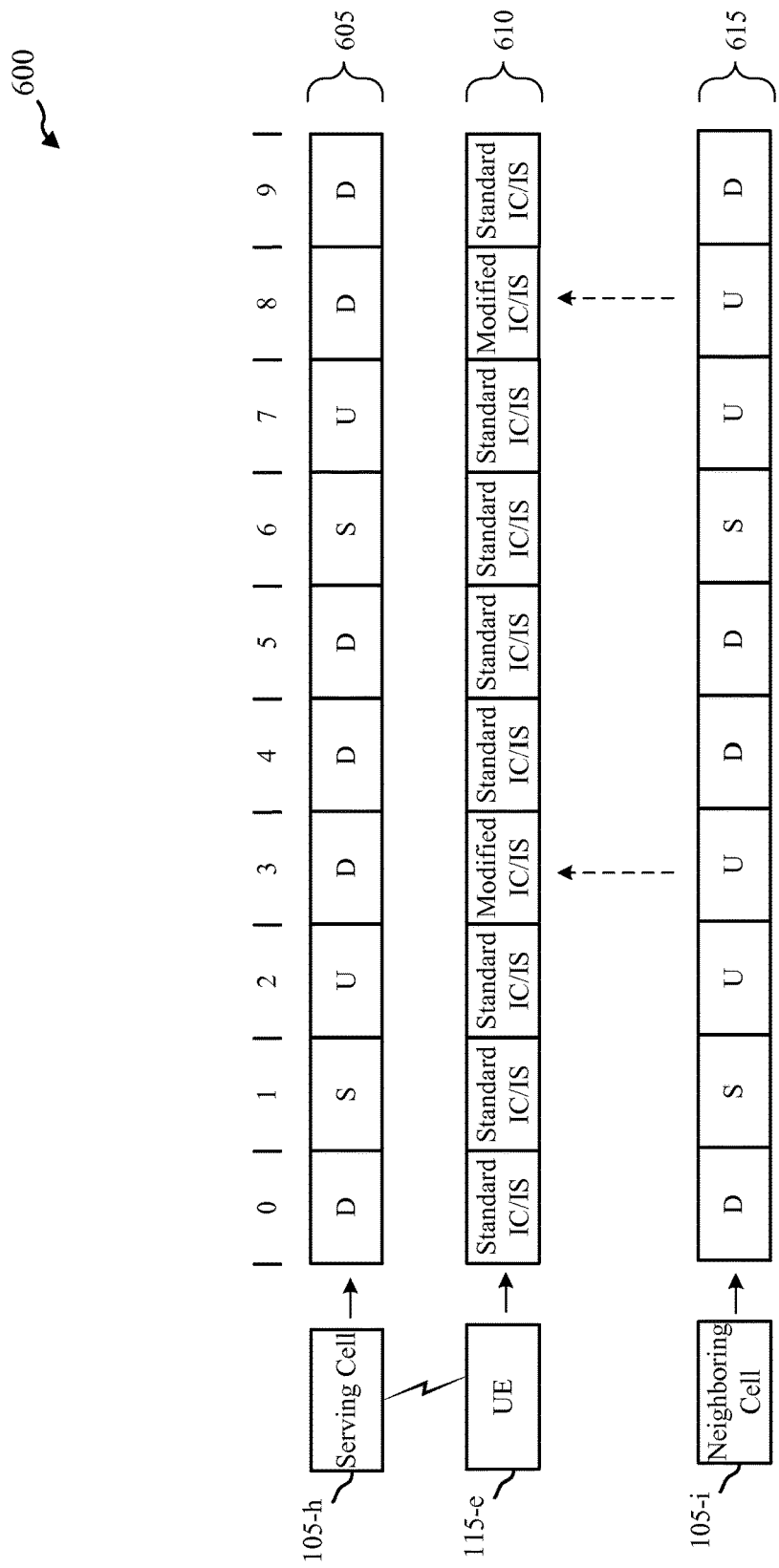
FIG. 6 shows a diagram of exemplary TDD frames of neighboring base stations with associated IC/IS operations of a UE in accordance with various embodiments.

For example, with reference to FIG. 6, an example wireless communications system 600 is depicted in which a serving cell 105-*h* may be in communication with UE 115-*e* according to TDD UL/DL configuration for TDD frame 605, and a neighboring cell 105-*i* may have interfering communications. Cells 105-*h* and 105-*i* and UE 115-*e* may illustrate, for example, aspects of wireless communications system 100 illustrated in FIG. 1 and/or networks 400 or 500 illustrated in FIGS. 4-5. Neighboring cell 105-*i*, in some examples, may operate according to a different TDD UL/DL configuration for TDD frame 615. The UE 115-*e* may perform IC/IS operations indicated at 610, and modify the IC/IS operations based on the different configuration for subframes 3 and 8. For example, neighboring cell 105-*i* may have previously been operating according to a different TDD UL/DL configuration, and be reconfigured to TDD UL/DL configuration of TDD frame 615. UE 115-*e* may have been performing IC/IS operations that thus need to be modified as indicated for subframes 3 and 8. In some embodiments, modifying IC/IS operations may include skipping IC/IS operations for the uplink portions from the neighboring cell 105-*i* transmitted during the first subframe when it is determined that the neighboring cell 105-*i* is operating according to the TDD configuration of frame 615.

In some embodiments, the serving cell 105-*h* may provide information to UE 115-*e* identifying at least a portion of one or more subframes in which IC/IS operations are to be skipped. Although a single neighboring cell 105-*i* is illustrated, two or more such neighboring cells may be present, and similar operations may be performed to account for potentially interfering signals associated with the other neighboring cells. In some further embodiments, the serving cell 105-*h* may provide information to UE 115-*e* that includes an indication of the TDD UL/DL configuration for the neighboring cell 105-*i*, which the UE 115-*e* may use to determine the subframes containing UL interference.

According to some embodiments, IC/IS modification for UL transmissions may be detected by UE 115-*e* via UL DM-RS detection, and/or facilitated through the determination, by UE 115-*e*, of uplink grants from the neighboring cell 105-*i*. In such embodiments, a UE 115-*e* may decode a PDCCH of neighboring cell 105-*i*. The PDCCH includes information for UL grants at the neighboring cell 105-*i*, from which cyclic shift $n\_dmrs\hat{\,}2$ for the PUSCH can be determined, along with other PUSCH related information. Additionally, UE 115-*e* may further detect, or have indicated to it, $n\_dmrs\hat{\,}1$ (cell-specific parameter) and $n\_PN$ (based on the PCI or virtual cell ID, slot index, etc.), such that the cyclic shift for the PUSCH Demodulation Reference Signal (DM-RS) sequence can be derived based on the formula $\alpha = 2\pi n_{CS}/12$, where:

$$n_{cs} = (n_{DMRS}^{(1)} + n_{DMRS}^{(2)} + n_{PN}(n_S)) \bmod 12$$

where $n^{(1)}_{DMRS}$ is cell specific and may be determined from a look-up table indexed using the cyclic shift broadcast in a system information block (SIB) by the neighboring cell 105-$i$, $n^{(2)}_{DMRS}$ is UE specific, and may be determined from a look-up table indexed using the cyclic shift within the downlink control information (DCI), and $n_{PN}(n_s)$ is generated using a pseudo-random sequence which is dependent upon the time slot number and the physical layer cell identity (PCI). Using this cyclic shift information, combined with possible PUSCH sequences (subject to group hopping and sequence-shift hopping), the DM-RS for PUSCH can be detected. According to some embodiments, the UE also may be informed (e.g., from serving cell 105-$h$) about possible DM-RS sequences for PUSCH and/or possible (n_dmrs_2, n_prs and n_dmrs_1), so UE 115-$e$ may determine whether a PUSCH exists in a PRB. In further embodiments, the UE 115-$e$ may be further assisted with information of possible PUSCH resource allocation type, hopping type (enabled/disabled, if enabled, which type), modulation order, etc., such as from serving cell 105-$h$.

According to some embodiments, information related to uplink transmissions may be determined based on PUCCH transmissions of neighboring cell 105-$i$. In some such embodiments, similar information/detection such as described above for sequences/cyclic shifts may be performed. Additionally, UE 115-$e$ may further have indicated to it the type of PUCCH (periodic, aperiodic, ACK/NAK vs. CQI vs. SR, etc.), such as through a communication from serving cell 105-$h$, for example. In still other embodiments, sounding reference signaling (SRS) information for neighboring cell 105-$i$ may be determined. For SRS, similar information/detection such as described above for sequences/cyclic shifts may be performed to determine subframes for SRS, aperiodic SRS vs. periodic SRS, and/or number of SRS ports, etc. Similarly, physical random access channel (PRACH) information for neighboring cell 105-$i$ may be determined. The PRACH formats, PRACH frequency locations, PRACH subframes (including UpPTS), etc. may be indicated (e.g., by service cell 105-$h$) or detected by UE 115-$e$. In such a manner, uplink information associated with neighboring cell 105-$i$ may be determined, and IC/IS may be modified based on such determinations.

While the example of FIG. 6 includes modified IC/IS operations for downlink or uplink subframes, similar operations may be performed in SSFs in the event that such SSFs include transmissions that may result in interference. For example, as discussed above, a SSF may include uplink or downlink data and/or control as part of transmissions during the SSF.

Figure 7:
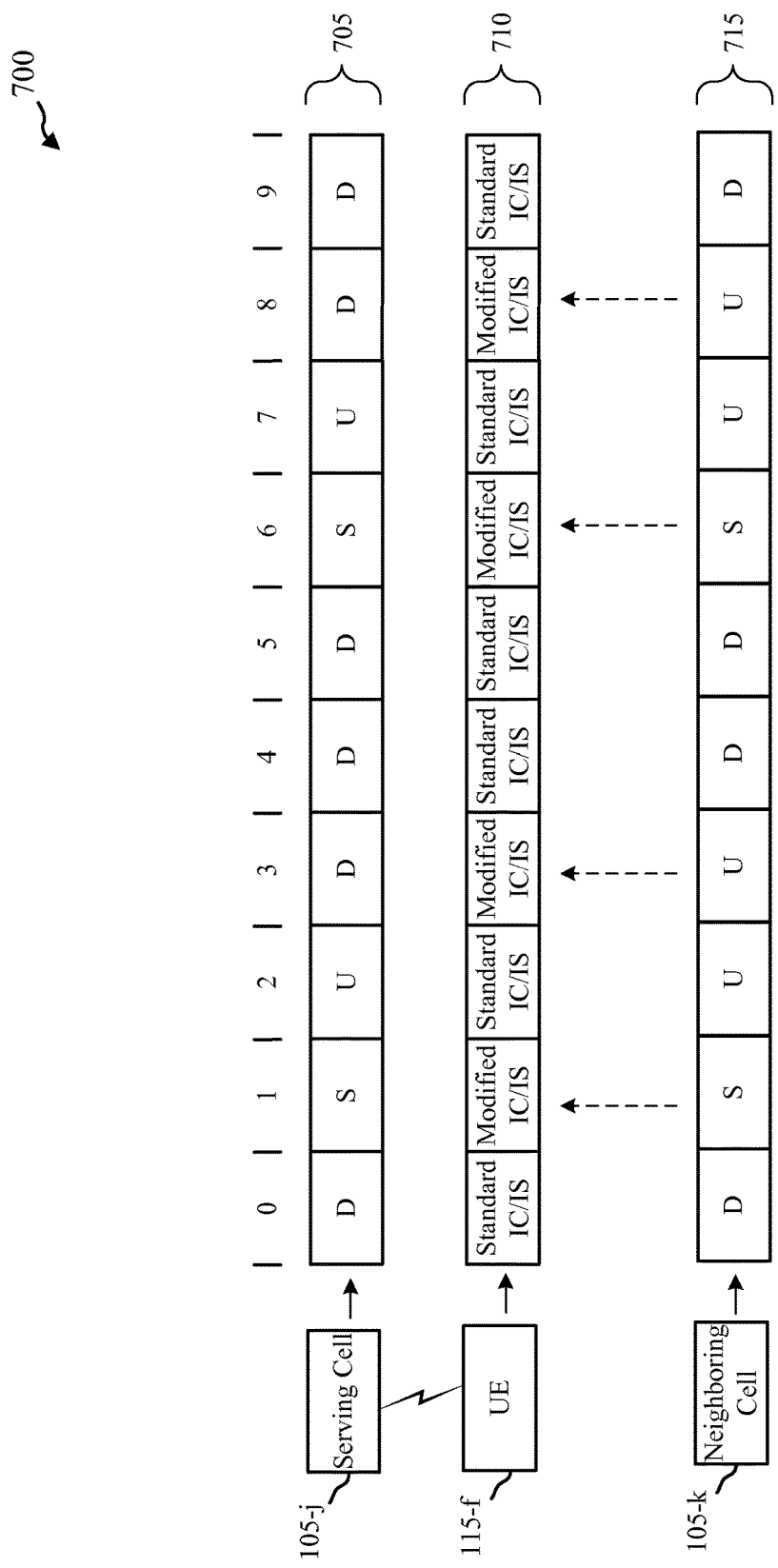
FIG. 7 shows another diagram of exemplary UL/DL subframes and special subframes of neighboring base stations with associated IC/IS operations of a UE in accordance with various embodiments.

FIG. 7 illustrates an example of a wireless communications system 700 in which SSFs may have different configurations between a serving cell 105-$j$ in communication with UE 115-$f$ and a neighboring cell 105-$k$. Cells 105-$j$ and 105-$k$ and UE 115-$f$ may illustrate, for example, aspects of wireless communications system 100 illustrated in FIG. 1 and/or networks 400 or 500 illustrated in FIGS. 4-5. Neighboring cell 105-$k$, in some examples, may operate according to a different TDD UL/DL configuration for TDD frame 715 than the configuration of TDD frame 705. For example, in addition to different subframe configurations for subframes 3 and 8, the SSFs of subframes 1 and 6 may have different subframe configurations. The UE 115-$f$ may perform IC/IS operations indicated at 710, and modify the IC/IS operations based on the different configuration for each of subframes 1, 3, 6 and 8. For example, neighboring cell 105-$i$ may have previously been operating according to a different TDD UL/DL configuration, and be reconfigured to TDD UL/DL configuration of TDD frame 615, which may also include some uplink information transmitted during SSFs of subframes 1 and 6. UE 115-$e$ may have been performing IC/IS operations that thus need to be modified as indicated for subframes 1, 3, 6 and 8. In some embodiments, similarly as described above, modifying IC/IS operations may include skipping IC/IS operations for the uplink portions of special subframes 1 and 6, and also skipping IC/IS operations for subframes 3 and 8, when it is determined that the neighboring cell 105-$k$ is operating according to the TDD configuration of the TDD frame 715.

In some embodiments, similarly as described above, the serving cell 105-$j$ may provide information to UE 115-$f$ identifying a portion of the special subframes in which IC/IS operations are to be skipped, as well as identifying changed subframes 3 and 8, for which IC/IS operations may be skipped. Although a single neighboring cell 105-$k$ is illustrated, two or more such neighboring cells may be present, and similar operations may be performed to account for potentially interfering signals associated with the other neighboring cells. In some further embodiments, the serving cell 105-$j$ may provide information to UE 115-$f$ that includes an indication of the TDD UL/DL configuration for the neighboring cell 105-$k$, which the UE 115-$f$ may use to determine the subframes containing UL interference.

In still further embodiments, UE 115-$f$ may blindly detect whether any subframes for the neighboring cell 105-$k$ include any downlink transmission and/or an uplink transmissions. Such detecting may be accomplished by, for example, receiving a reference signal of the neighboring cell 105-$k$ and determining subframes that include uplink, downlink, and SSFs that include downlink and/or uplink transmissions based on information associated with the reference signal. Blind detection may also be accomplished by, for example, receiving a resource block of the neighboring base station and assuming that all transmitted subframes are consistent with the information in the resource block.

Additionally or alternatively, UE 115-$f$ may receive assistance information for assisting UE 115-$f$ in IC/IS operations. In one example, serving cell 105-$j$ may transmit assistance information in system broadcast messages (e.g., SIB, etc.). Assistance information may include information that can be used by UE 115-$f$ to find synchronization signals, system broadcast channels, and/or paging channels of transmissions of neighboring cell 105-$k$. Assistance information also may include, for example, a synchronization indicator, SFN alignment indicator, radio frame boundary indicator, SIB/paging information, and/or interference cancellation subframe indicator. Synchronization indicator, SFN alignment indicator, and/or radio frame boundary indicator, in some examples, may be transmitted by neighboring cell 105-$k$ to provide information about frame timing of TDD frame 715 relative to frame timing of TDD frame 705. For example, synchronization indicator may indicate that TDD frame 715 is synchronized with TDD frame 705. SFN alignment indicator may indicate whether TDD frame 715 is SFN aligned with TDD frame 705, while radio frame boundary indicator may indicate a relative offset of radio frames in TDD frame 715 from the TDD frame 705. In some embodiments, serving cell 105-$j$ and/or neighboring cell 105-$k$ may transmit an interference cancellation subframe indicator, which may indicate a particular subframe (e.g., relative to the start of the TDD frame 705) for applying interference cancellation (e.g., successive interference cancellation (SIC), etc.). By reducing the number of subframes for which to apply interference cancellation, interference cancellation subframe indicator 360 may reduce the time and/or power for successfully decoding signals and/or channels of transmission.

Figure 8:
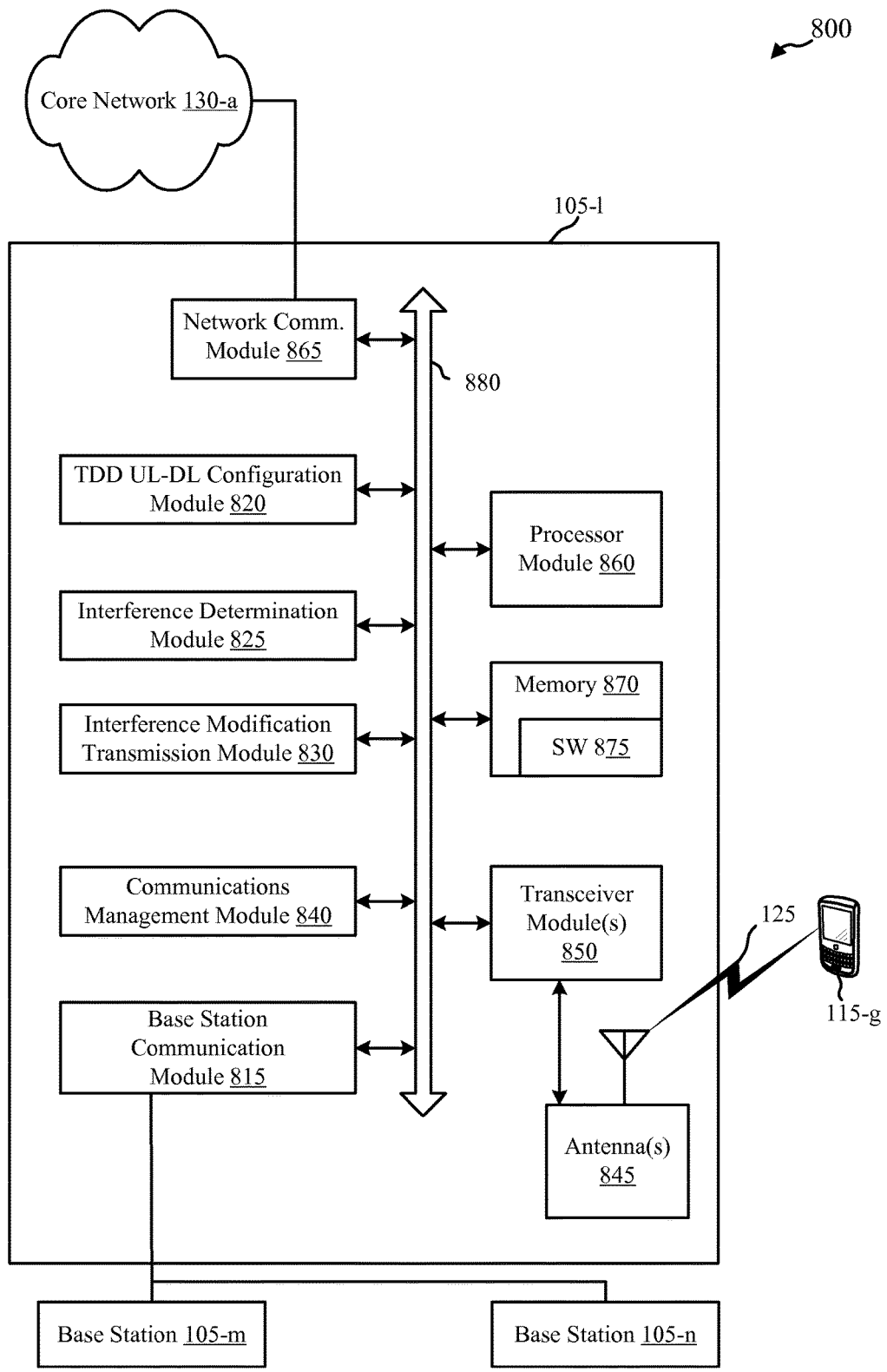
FIG. 8 shows a block diagram of an example of a base station in accordance with various embodiments.

FIG. 8 shows a block diagram of a wireless communications system 800 that may be configured for IC/IS modification. This wireless communications system 800 may be an example of aspects of the wireless communications system 100 illustrated in FIG. 1, networks 400 or 500 illustrated in FIGS. 4-5, and/or wireless communications systems 600 or 700 of FIGS. 6-7. The wireless communications system 800 may include a base station 105-*l*. Base station 105-*l* may be an example of a base station 105 of FIG. 1, or 4-7. The base station 105-*l* may include antenna(s) 845, a transceiver module 850, memory 870, and a processor module 860, which each may be in communication, directly or indirectly, with each other (e.g., over one or more buses 880). The transceiver module 850 may be configured to communicate bi-directionally, via the antenna(s) 845, with UE 115-*g*. The transceiver module 850 (and/or other components of the base station 105-*l*) may also be configured to communicate bi-directionally with one or more networks. In some cases, the base station 105-*l* may communicate with the core network 130-*a* through network communications module 865. Base station 105-*l* may be an example of a serving base station, a neighboring base station, an eNodeB base station, a Home eNodeB base station, a NodeB base station, and/or a Home NodeB base station.

Base station 105-*l* may also communicate with other base stations 105, such as base station 105-*m* and base station 105-*n*. In some cases, base station 105-*l* may communicate with other base stations such as 105-*m* and/or 105-*n* utilizing base station communication module 815. In some embodiments, base station communication module 815 may provide an X2 interface within an LTE wireless communication technology to provide communication between some of the base stations 105. In some embodiments, base station 105-*l* may communicate with other base stations through core network 130-*a*.

The memory 870 may include random access memory (RAM) and read-only memory (ROM). The memory 870 may also store computer-readable, computer-executable software code 875 containing instructions that are configured to, when executed, cause the processor module 860 to perform various functions described herein (e.g., call processing, database management, message routing, etc.). Alternatively, the computer-executable software code 875 may not be directly executable by the processor module 860 but be configured to cause the processor, e.g., when compiled and executed, to perform functions described herein.

The processor module 860 may include an intelligent hardware device, e.g., a central processing unit (CPU), a microcontroller, an application-specific integrated circuit (ASIC), etc. The transceiver module(s) 850 may include a modem configured to modulate the packets and provide the modulated packets to the antenna(s) 845 for transmission, and to demodulate packets received from the antenna(s) 845. While some examples of the base station 105-*l* may include a single antenna 845, the base station 105-*l* may include multiple antennas 845 for multiple links, which may support carrier aggregation. For example, one or more links may be used to support macro communications with UE 115-*g*.

According to the architecture of FIG. 8, the base station 105-*l* may further include a communications management module 840. The communications management module 840 may manage communications with other base stations 105. By way of example, the communications management module 840 may be a component of the base station 105-*l* in communication with some or all of the other components of the base station 105-*l* via a bus 880. Alternatively, functionality of the communications management module 840 may be implemented as a component of the transceiver module 850, as a computer program product, and/or as one or more controller elements of the processor module 860.

In some embodiments, the transceiver module 850 in conjunction with antenna(s) 845, along with other possible components of base station 105-*l*, may determine TDD UL-DL configurations for various UEs communicating with the base station 105-*l*, and also determine UEs or other base stations that may be configured with different TDD UL-DL configurations. In some embodiments, base station 105-*l* includes a TDD UL-DL configuration module 820 that determines a TDD UL-DL configuration for UE 115-*g*, and may also determine configurations for one or more of TDD UL/DL configurations or SSF configurations of neighboring cells. As discussed above, in some aspects, UE 115-*g* may encounter interference from one or more neighboring cells and TDD UL-DL configuration module 820 may determine UL-DL configurations and/or SSF configurations for such neighboring cells. At some point, TDD UL-DL configuration module 820 may determine that the UL-DL configuration and/or SSF configuration for one or more neighboring cells has changed, which may result in interference at UE 115-*g*. This information may be provided to interference determination module 825, which may determine that IC/IS for at least a portion of one or more subframes is to be modified at the UE 115-*g*. Interference modification transmission module 830 may then transmit IC/IS modification information via transceiver module 850 to UE 115-*g*.

Figure 9:
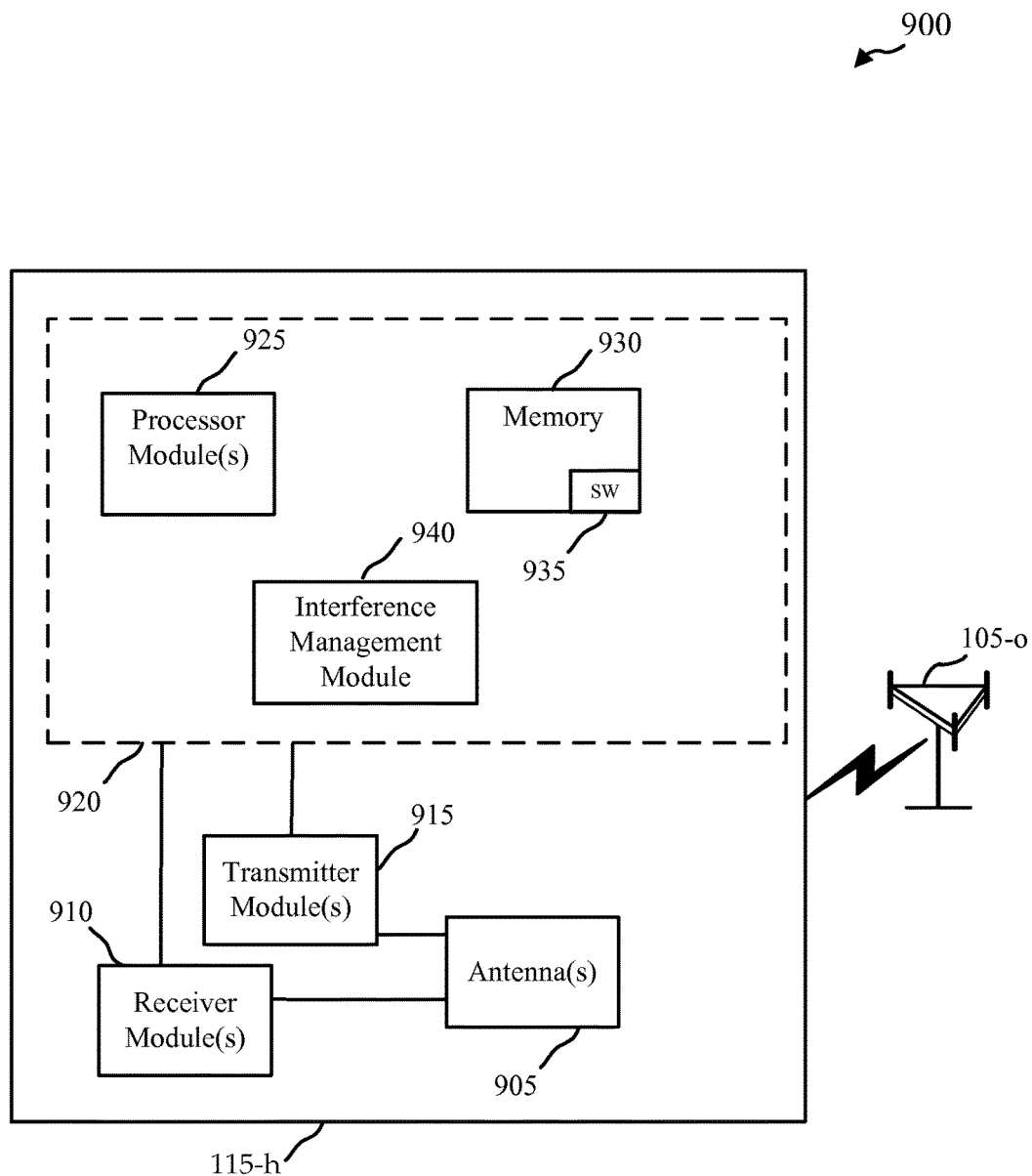
FIG. 9 shows a block diagram of an example of a user equipment in accordance with various embodiments.

With reference now to FIG. 9, an example wireless communications system 900 that performs interference modification is depicted. The wireless communications system 900 includes a UE 115-*h* that may communicate with base station 105-*o* to receive access to one or more wireless networks, and may be an example of aspects of the wireless communications system 100 of FIG. 1, networks 400 or 500 of FIGS. 4-5, or wireless communications systems 600 or 700 of FIGS. 6-7. UE 115-*h* may be an example of a user equipment 115 of FIG. 1, or 4-7. UE 115-*h*, includes one or more antenna(s) 905 communicatively coupled to receiver module(s) 910 and transmitter module(s) 915, which are in turn communicatively coupled to a control module 920. Control module 920 includes one or more processor module(s) 925, a memory 930 that may include computer-executable software code 935, and an interference management module 940. The computer-executable software code 935 may be for execution by processor module 925 and/or interference management module 940.

The processor module(s) 925 may include an intelligent hardware device, e.g., a central processing unit (CPU), a microcontroller, an application specific integrated circuit (ASIC), etc. The memory 930 may include random access memory (RAM) and read-only memory (ROM). The memory 930 may store computer-readable, computer-executable software code 935 containing instructions that are configured to, when executed (or when compiled and executed), cause the processor module 925 and/or interference management module 940 to perform various functions described herein (e.g., subframe configuration determination, and IC/IS modification on identified portions of subframes). The interference management module 940 may be implemented as a part of the processor module(s) 925, or may be implemented using one or more separate CPUs or ASICs, for example. The transmitter module(s) 915 may transmit to base station 105-*o* (and/or other base stations) to establish communications with one or more wireless communications networks (e.g., E-UTRAN, UTRAN, etc.), as described above. The interference management module 940 may be configured to determine one or more portions of one or more subframes that require IC/IS modification, similarly as described above. In some examples, the interference management module 940 may also be configured to receive information from base station 105-*o* related to IC/IS modification, and take appropriate actions to modify IC/IS operations associated with one or more portions of one or more subframes, in accordance with examples as described above. The receiver module(s) 910 may receive downlink transmissions from base station 105-*o* (and/or other base stations), as described above. Downlink transmissions are received and processed at the user equipment 115-*h*. The components of UE 115-*h* may, individually or collectively, be implemented with one or more Application Specific Integrated Circuits (ASICs) adapted to perform some or all of the applicable functions in hardware. Each of the noted modules may be a means for performing one or more functions related to operation of the UE 115-*h*.

Figure 10:
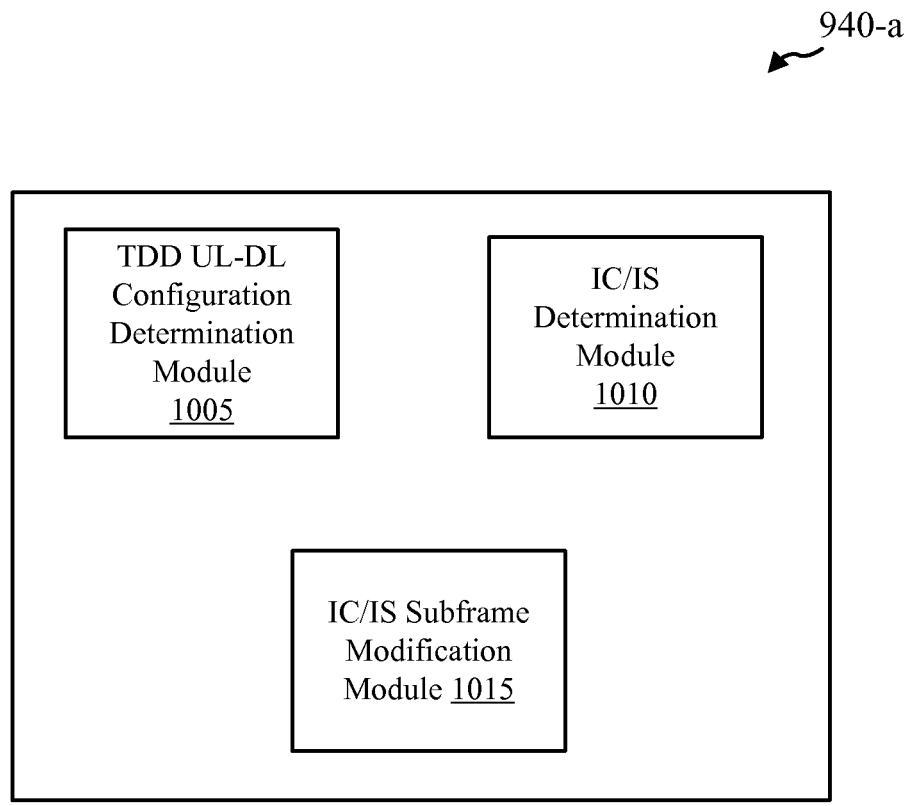
FIG. 10 shows a block diagram of an example of an IC/IS modification module in accordance with various embodiments.

FIG. 10 illustrates an example of an interference management module 940-*a*, which includes a TDD UL-DL configuration determination module 1005, an IC/IS determination module 1010, and an IC/IS subframe modification module 1015. The TDD UL-DL configuration determination module 1005 may determine one or more of a TDD UL-DL configuration and/or SSF configuration. Such a determination may be made in accordance with the examples described above through, for example, receipt of information from a serving base station or blind detection of the configuration. The IC/IS determination module 1010 may receive configuration information and/or other information (e.g., assistance information) and determine IC/IS to be applied for different subframes received at the UE. IC/IS subframe modification module 1015 may modify IC/IS operations at the UE for one or more subframes, or portions of one or more SSFs, based on the determination of the IC/IS determination module 1010. The components of the interference management module 940-*a* may, individually or collectively, be implemented with one or more ASICs adapted to perform some or all of the applicable functions in hardware. Each of the noted modules may be a means for performing one or more functions related to operation of the interference management module 940-*a*.

Figure 11:
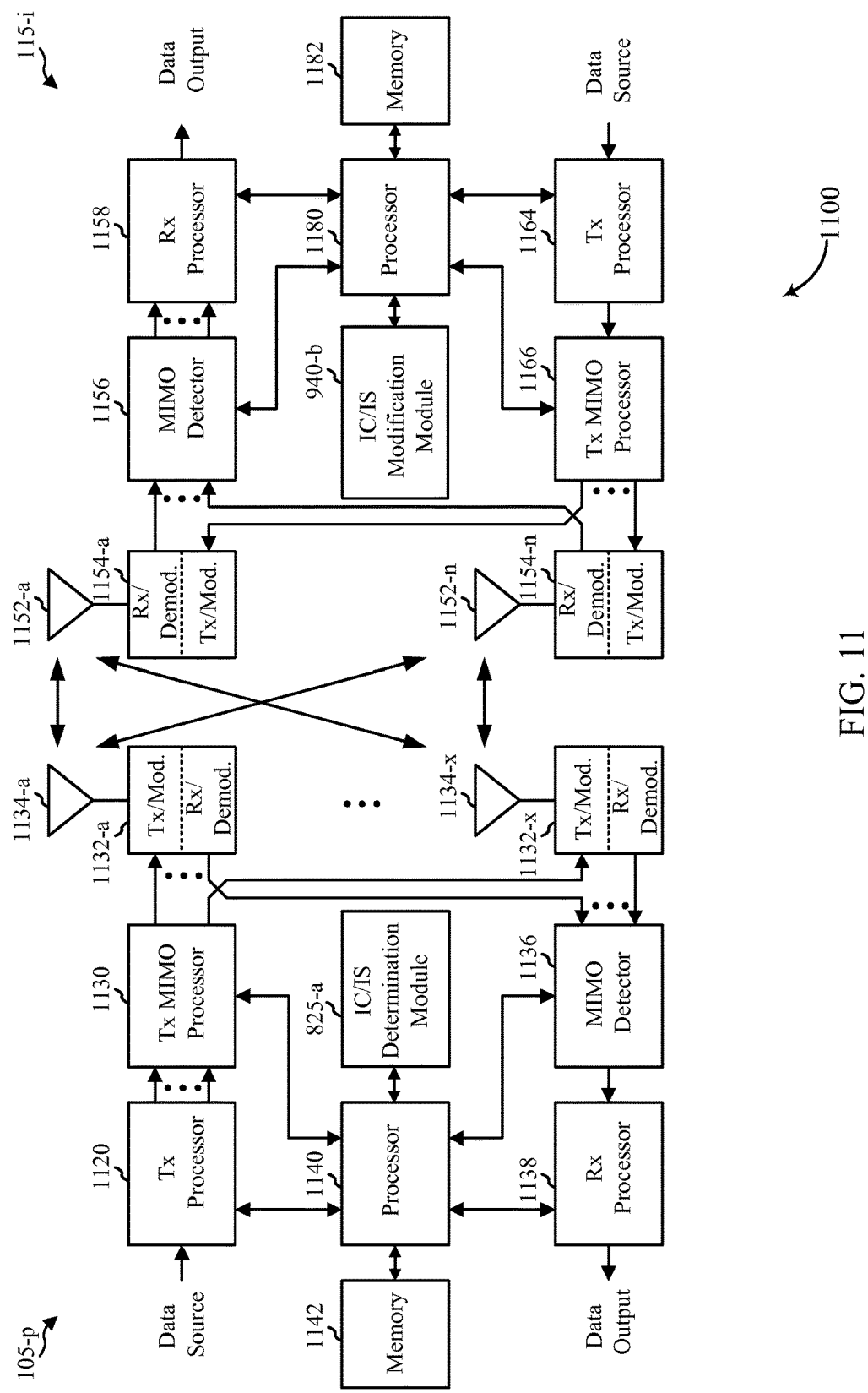
FIG. 11 is a block diagram of an example of a wireless communications system including a base station and a mobile device in accordance with various embodiments.

FIG. 11 is a block diagram of a wireless communications system 1100 including a base station 105-*p* and a UE 115-*i*. This wireless communications system 1100 may be an example of the wireless communications system 100 of FIG. 1, networks 400 or 500 of FIGS. 4-5, wireless communications systems 600, 700, 800, or 900 of FIGS. 6-9. The base station 105-*p* may be equipped with antennas 1134-*a* through 1134-*x*, and the UE 115-*i* may be equipped with UE antennas 1152-*a* through 1152-*n*. At the base station 105-*p*, a transmit processor 1120 may receive data from a data source.

The transmit processor 1120 may process the data. The transmit processor 1120 may also generate reference symbols, and a cell-specific reference signal. A transmit (TX) MIMO processor 1130 may perform spatial processing (e.g., precoding) on data symbols, control symbols, and/or reference symbols, if applicable, and may provide output symbol streams to the base station modulator/demodulators 1132-*a* through 1132-*x*. Each base station modulator/demodulator 1132 may process a respective output symbol stream (e.g., for OFDM, etc.) to obtain an output sample stream. Each base station modulator/demodulator 1132 may further process (e.g., convert to analog, amplify, filter, and upconvert) the output sample stream to obtain a downlink (DL) signal. In one example, DL signals from base station modulator/demodulators 1132-*a* through 1132-*x* may be transmitted via the antennas 1134-*a* through 1134-*x*, respectively according to a particular TDD Uplink/Downlink configuration.

At the UE 115-*i*, the UE antennas 1152-*a* through 1152-*n* may receive the DL signals according to the particular TDD Uplink/Downlink configuration from the base station 105-*p* and may provide the received signals to the UE modulator/demodulators 1154-*a* through 1154-*n*, respectively. Each UE modulator/demodulator 1154 may condition (e.g., filter, amplify, downconvert, and digitize) a respective received signal to obtain input samples. Each UE modulator/demodulator 1154 may further process the input samples (e.g., for OFDM, etc.) to obtain received symbols. A MIMO detector 1156 may obtain received symbols from all the UE modulator/demodulators 1154-*a* through 1154-*n*, perform MIMO detection on the received symbols if applicable, and provide detected symbols. A receive processor 1158 may process (e.g., demodulate, deinterleave, and decode) the detected symbols and perform interference cancellation and/or suppression operations on the detected symbols, providing decoded data for the UE 115-*i* to a data output, and provide decoded control information to a processor 1180, or memory 1182. The processor 1180 may be coupled with an interference management module 940-*b* that may determine and modify IC/IS operations of the UE 115-*i*, such as described above. The processor 1180 may perform frame formatting according to a current TDD UL/DL configuration and/or current SSF configuration.

On the uplink (UL), at the UE 115-*i*, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the UE modulator/demodulators 1154-*a* through 1154-*n* (e.g., for SC-FDMA, etc.), and be transmitted to the base station 105-*p* in accordance with the transmission parameters received from the base station 105-*p*. At the base station 105-*p*, the UL signals from the UE 115-*i* may be received by the antennas 1134, processed by the base station modulator/demodulators 1132, detected by a MIMO detector 1136 if applicable, and further processed by a receive processor 1138. The receive processor 1138 may provide decoded data to a data output and to the processor 1140. A memory 1142 may be coupled with the processor 1140. The processor 1140 may perform frame formatting according to a current TDD UL/DL configuration and/or current SSF configuration. An interference determination module 825-*a* may, in some embodiments determine and IC/IS operations that may require modification at the UE 115-*i* based on subframe configurations of one or more neighboring base stations. Similarly as discussed above, wireless communications system 1100 may support operation on multiple component carriers, each of which include waveform signals of different frequencies that are transmitted between base station 105-*p* and UEs 115-*i*. Multiple component carriers may carry uplink and downlink transmissions between the UE 115-*i* and base station 105-*p*, and base station 105-*p* may support operation on multiple component carriers that may each have different TDD configurations and thus each have different IC/IS operations. The components of the UE 115-*i* may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1100. Similarly, the components of the base station 105-p may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1100.

Figure 12:
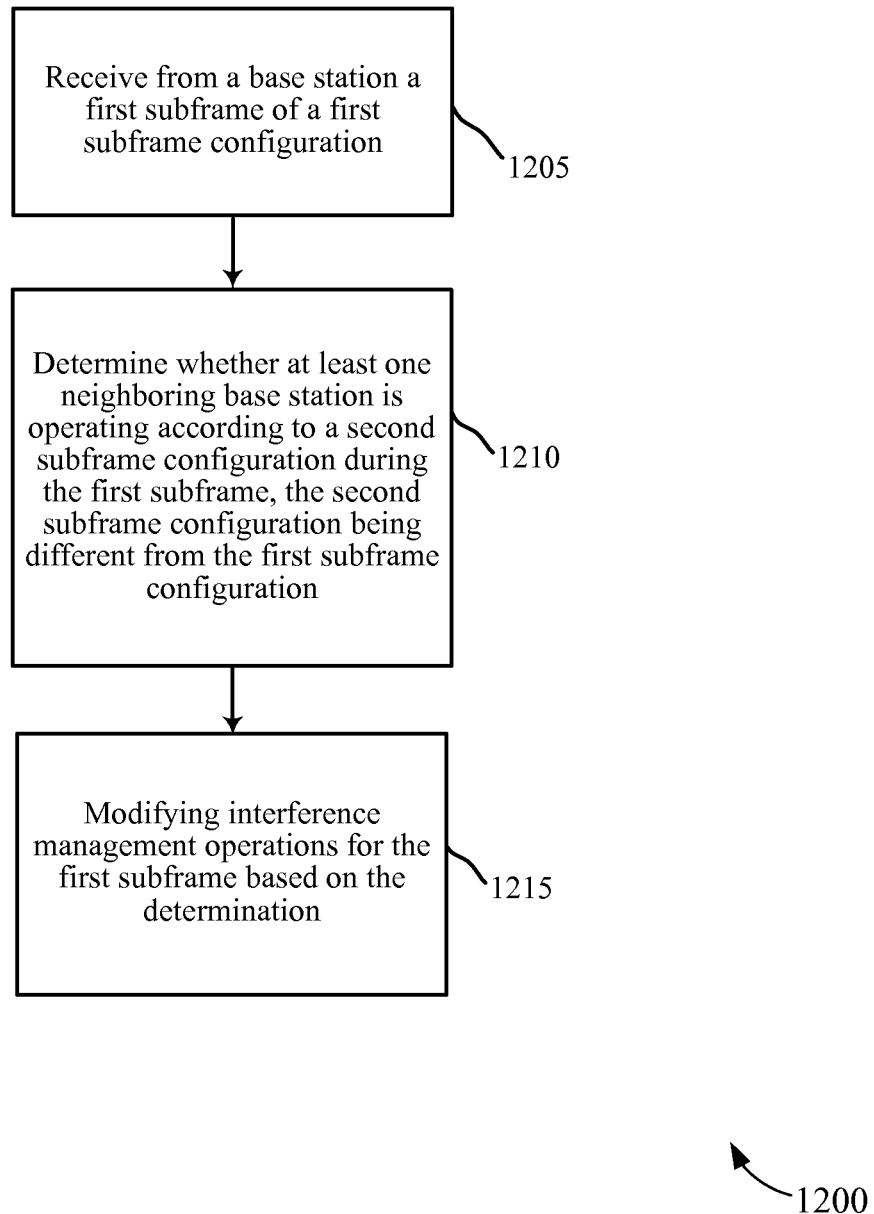
FIG. 12 is a flowchart of a method for IC/IS modification in accordance with various embodiments.

FIG. 12 illustrates a method 1200 that may be carried out by a wireless communications system according to various embodiments. The method 1200 may, for example, be performed by a UE of FIG. 1, 4-9, or 11, or using any combination of the devices described for these figures. Initially, at block 1205, the UE receives from a base station a first subframe of a first subframe configuration. For example, the UE receive a downlink transmission of a downlink subframe of a TDD UL/DL configuration, or may receive a downlink transmission is a portion of a SSF. At block 1210, the UE determines whether at least one neighboring base station is operating according to a second subframe configuration during the first subframe, the second subframe configuration being different from the first subframe configuration. For example, a neighboring base station may be communicating with another UE according to a different TDD UL/DL configuration or SSF configuration. Such communications of the neighboring base station may result in interference at the UE, similarly as discussed above. Based on the determination, the UE may modify interference management operations for the downlink transmission in the subframe, as indicated at block 1215. The determination may be made either before the transmission of the first subframe or during the transmission of the first subframe, according to some embodiments.

Figure 13:
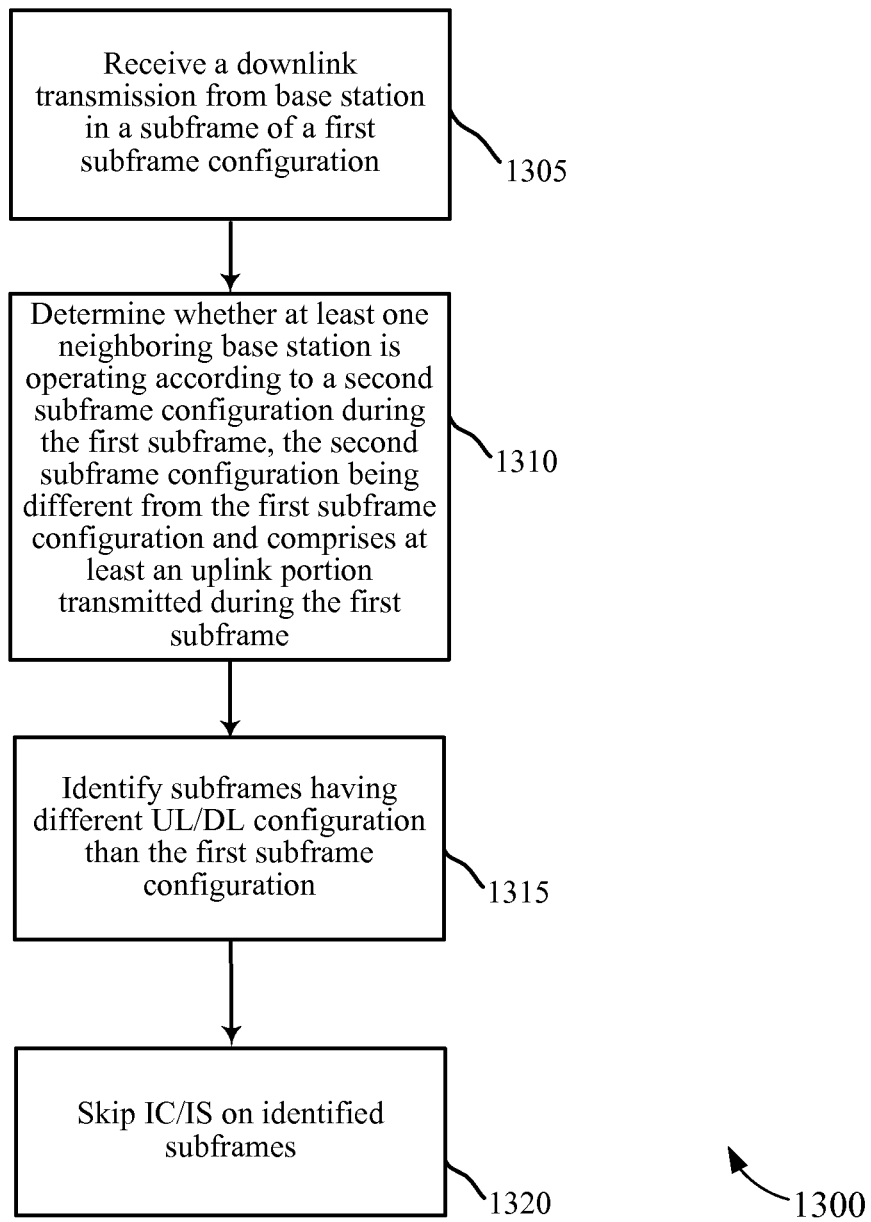
FIG. 13 is a flowchart of another method for IC/IS modification in accordance with various embodiments.
Figure 14:
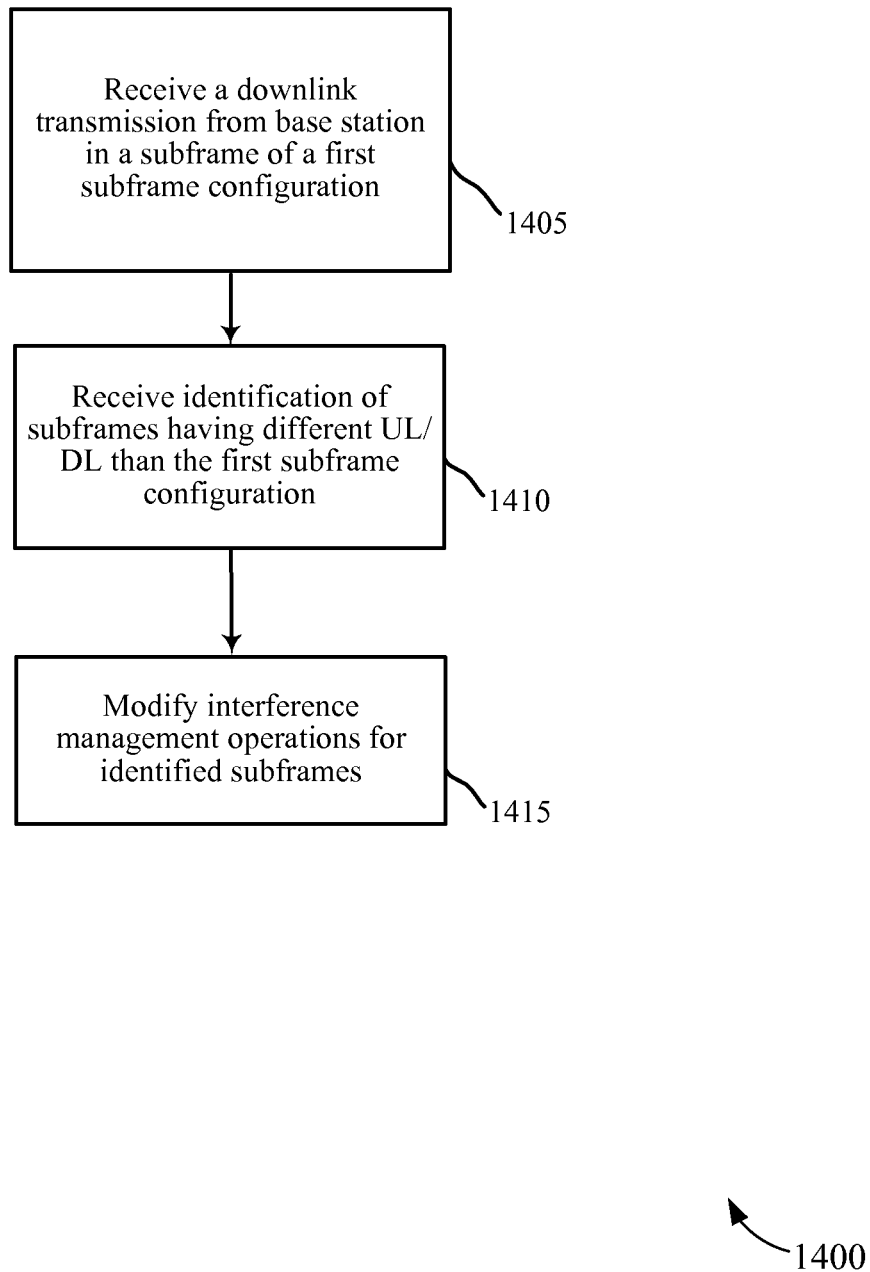
FIG. 14 is a flowchart of another method for IC/IS modification in accordance with various embodiments.
Figure 15:
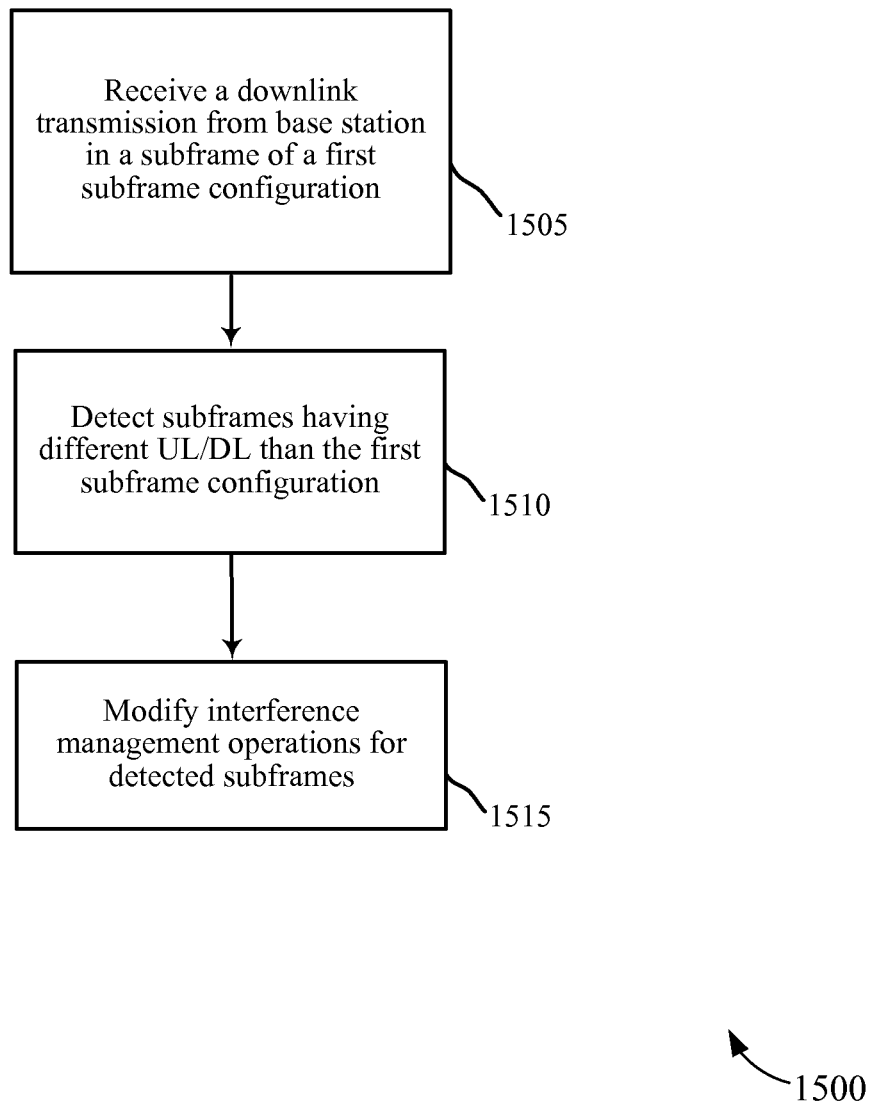
FIG. 15 is a flowchart of another method for IC/IS modification in accordance with various embodiments.

As discussed above, modification of IC/IS operations may be accomplished using one or more of various different techniques, some examples of which are discussed with respect to FIGS. 13-15. With reference initially to FIG. 13, one method 1300 that may be carried out by a UE according to various embodiments is illustrated. The method 1300 may, for example, be performed by a UE of FIG. 1, 4-9, or 11, or using any combination of the devices described for these figures. Initially, at block 1305, the UE receives a downlink transmission from a base station in a first subframe of a first subframe configuration, similarly as discussed above. At block 1310, the UE determines whether at least one neighboring base station is operating according to a second subframe configuration during the first subframe, the second subframe configuration different from the first subframe configuration and including at least an uplink portion. For example, a neighboring base station may be communicating with another UE according to a different TDD UL/DL configuration or SSF configuration. The determination may be made either before the transmission of the first subframe or during the transmission of the first subframe, according to some embodiments. Based on the determination, the UE identifies subframes having different UL/DL configuration than the first subframe configuration, as indicated at block 1315. At block 1320, the UE modifies IC/IS operations by skipping IC/IS operations associated with the identified subframes. In the case that an identified subframe is a SSF, a portion of which has a different UL/DL configuration, the UE may modify IC/IS operations by skipping IC/IS operations for the identified portion of the SSF, and performing IC/IS operations for the remaining portions of the SSF. According to some embodiments, the common set of subframes over all TDD configurations is DSUxxDxxxx, where x is configuration-dependent (uplink, downlink, or special subframe). As a result, the determination may be limited, in some embodiments, to address the remaining 6 subframes (i.e., the configuration-dependent subframes) in a frame. Alternatively, in some embodiments, for maximum flexibility for eNB, the determination may be extended to all subframes (instead of only to 6 subframes). In some embodiments, the determination may be done on a per interfering cell basis, or per UE basis for all interfering cells (which may be helpful in UL interference of the particular UE is not deemed significant), or somewhere in between.

As mentioned above, in some embodiments IC/IS operations may be modified for SSFs. In some embodiments, a UE may simply always skip subframes 1 and 6 if there are both 5 ms and 10 ms switching periodicities, and may always skip subframe 1 if there is only 10 ms switching periodicity. Such skipping may be indicated or predetermined, and in some cases a UE may also be indicated whether skipping should be enabled or not (e.g., if the serving cell and interfering cells are of the same configuration, no skipping; otherwise, skipping.). Such signaling may be done on a per interfering cell basis, or per UE for all interfering cells, or somewhere in between.

FIG. 14 illustrates another method 1400 that may be carried out by a UE in a wireless communications system according to various embodiments that modifies interference operations for certain identified subframes. The method 1400 may, for example, be performed by a UE of FIG. 1, 4-9, or 11, or using any combination of the devices described for these figures. Initially, at block 1405, the UE receives a downlink transmission from a base station in a first subframe of a first subframe configuration, similarly as discussed above. At block 1410, the UE receives an identification of subframes having a different UL/DL configuration than the first subframe configuration. Such identification of subframes may be provided, for example, by a serving base station, and may include identification of subframes and/or identification of one or more portions of SSF(s) that have a different UL/DL configuration than the first subframe configuration. In some embodiments, a UE may assume that the identified subframe(s) only contain UL interference, or alternatively, may contain either UL or DL interference for one or more interference cells. Again since the common set of subframes over all TDD configurations is DSUxxDxxxx, where x is configuration-dependent (uplink, downlink, or special subframe), the indication may be, in some embodiments, limited to address the remaining 6 subframes (i.e., the configuration-dependent subframes) in a frame. Alternatively, in some embodiments, the indication can be extended to all subframes (instead of only to 6 subframes). Similarly as described above, such signaling may be done on a per interfering cell basis, or per UE for all interfering cells, or somewhere in between. Furthermore, such signaling may be implicit or explicit. For example, implicit signaling may be provided to the UE that includes corresponding DL/UL subframe configuration of one or more interfering cells, and the UE can then determine whether a subframe is DL or UL. Explicit signaling may provide information to the UE that directly indicates whether a subframe is DL/UL for one or more interfering cells. As also discussed above, a UE may perform interference management modifications for SSFs, and a UE may receive signaling to indicate special subframe configurations for one or more interfering cells for IS/IC, according to some embodiments.

Based on the identification of subframes, or portion(s) of SSF(s), the UE modifies interference management operations for the identified subframes, as indicated at block 1415. In the case that an identified subframe is a SSF, a portion of which has a different UL/DL configuration, the UE may modify IC/IS operations for the identified portion of the SSF, and perform standard IC/IS operations for the remaining portions of the SSF. Modification of IC/IS may include, for example, skipping of the subframes or portions of subframes, modifying IC/IS based on information related to the neighboring base station, such as described above, or may be based on assistance information provided that is associated with the modified subframes or subframe portions.

FIG. 15 illustrates another method 1500 that may be carried out by a base station a wireless communications system according to various embodiments The method 1500 may, for example, be performed by a UE of FIG. 1, 4-9, or 11, or using any combination of the devices described for these figures. Initially, at block 1505, the UE receives a downlink transmission from a base station in a first subframe of a first subframe configuration, similarly as discussed above. At block 1510, the UE detects subframes having different UL/DL than the first subframe configuration. Such detection of subframes may include, for example, detection of only subframes that may change from uplink to downlink in different TDD UL/DL configurations. For example, because the common set of subframes over all TDD configurations is DSUxxDxxxx, where x is configuration-dependent (uplink, downlink, or special subframe), the blind detection may be done only for the remaining 6 subframes (i.e., the configuration-dependent subframes). The detection, in some embodiments, may be done on a per interfering cell basis, and/or jointly for all interfering cells for the remaining subframes. In some further embodiments, the UE may perform blind detection by comparing DL CRS/UE-RS with UL PUCCH DM-RS/PUSCH DM-RS on a per PRB basis. In cases where a physical cell or a virtual cell (represented by a virtual cell ID) in a subframe is associated with downlink or uplink transmissions, the UE may assume in some embodiments that the entire subframe of the cell is dedicated for downlink or uplink transmissions, instead of mixed downlink/uplink transmissions of the cell in the same subframe. In still further embodiments, a UE may assume that the DL/UL subframe configuration between the serving cell and one or more interfering cells for IS/IC is the same. Furthermore, in some embodiments, a UE may blindly detect the special subframe configuration for one or more interfering cells. In such embodiments, the UpPTS part of the special subframe may carry SRS and/or PRACH (PRACH is possible only if there are two UpPTS symbols). In other embodiments, the UE may assume the same special subframe structure between the serving cell and one or more interfering cells for IS/IC. In further embodiments, the SSF UL detection may include identification of subframes and/or identification of one or more portions of SSF(s) that have a different UL/DL configuration than the first subframe configuration.

Based on the detection of subframes, or portion(s) of SSF(s), the UE modifies interference management operations for the identified subframes, as indicated at block 1515. In the case that an identified subframe is a SSF, a portion of which has a different UL/DL configuration, the UE may modify IC/IS operations for the identified portion of the SSF, and perform standard IC/IS operations for the remaining portions of the SSF. Modification of IC/IS may include, for example, skipping of the subframes or portions of subframes, modifying IC/IS based on information related to the neighboring base station, such as described above, or may be based on assistance information provided that is associated with the modified subframes or subframe portions.

Figure 16:
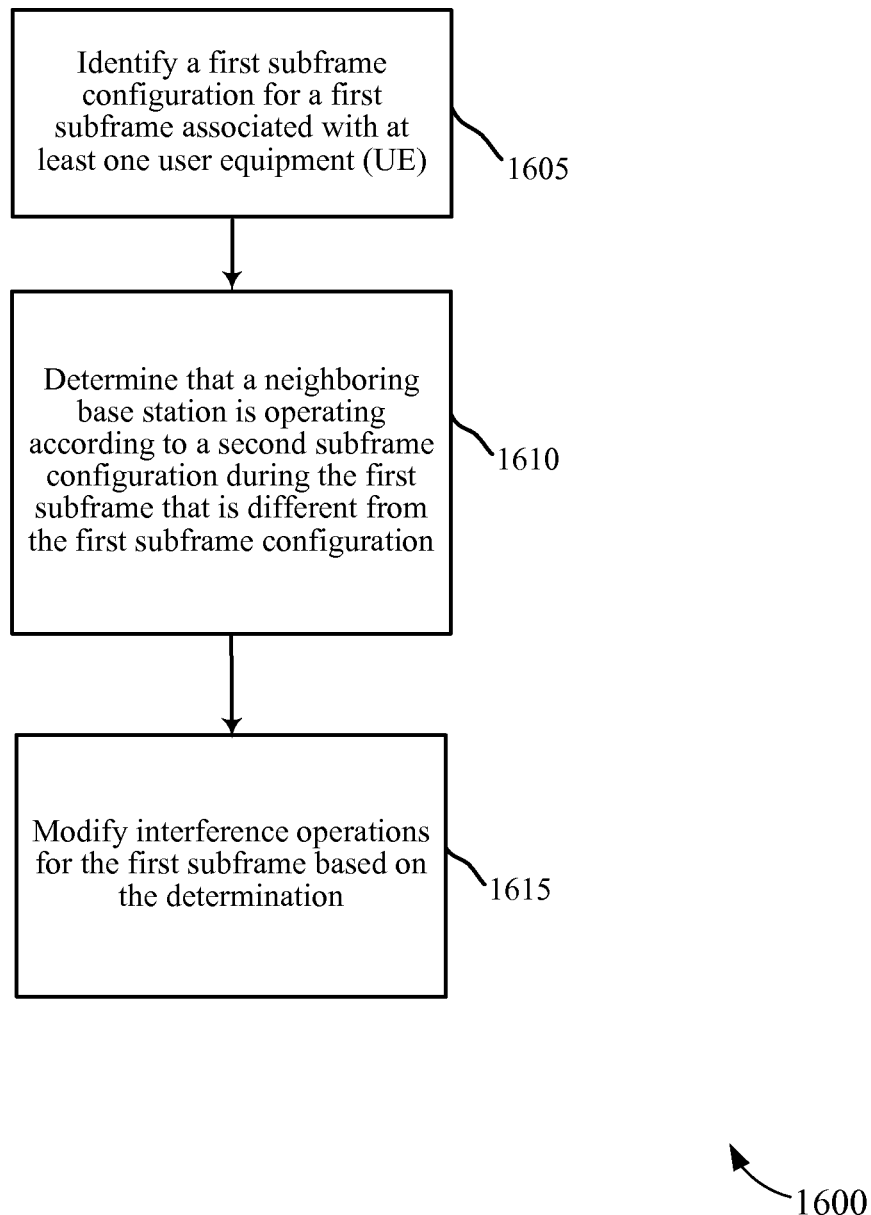
FIG. 16 is a flowchart of another method for IC/IS modification in accordance with various embodiments.

FIG. 16 illustrates a method 1600 that may be carried out by a base station in a wireless communications system according to various embodiments. The method 1600 may, for example, be performed by a base station of FIG. 1, 4-9, or 11, or using any combination of the devices described for these figures. Initially, at block 1605, the base station identifies a first subframe configuration for a first subframe associated with at least one UE. At block 1610, the base station determines that a neighboring base station is operating according to a second subframe configuration during the first subframe that is different from the first subframe configuration. The base station may then modify interference operations for at least the first subframe based on the determination, as indicated at block 1615. The modification of IC/IS operations may include one or more of the above described modifications for IC/IS operations, for example.

This modification may be transmitted to the UE, which may then modify IC/IS operations accordingly. The modifying IC/IS operations comprises transmitting information to the UE identifying at least the downlink transmission in the first subframe for IC/IS modification. According to some embodiments, the base station may transmit modification information to the UE, which may include, for example, a bitmap identifying a subset of subframes, and the modifying IC/IS operations includes skipping IC/IS operations for the subframes identified in the bitmap. Such information may also include information for two or more neighboring base stations, according to some embodiments. The information may also include, for example, an indication of the TDD UL/DL configuration for the neighboring base station and one or more of a subset of subframes containing UL interference may be determined based on the TDD UL/DL configuration for the neighboring cell.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications performed by a user equipment (UE), comprising:
receiving from a base station a first subframe of a first subframe configuration;
receiving a reference signal of a neighboring base station;
determining that the neighboring base station is operating according to a neighboring subframe configuration during the first subframe based on information associated with the received reference signal, the neighboring subframe configuration being different from the first subframe configuration;
modifying interference cancellation/interference suppression (IC/IS) operations for the first subframe based on the determination that the neighboring base station is operating according to the neighboring subframe configuration during the first subframe; and
modifying IC/IS operations for a third subframe in response to a third subframe configuration being the same as a fourth subframe configuration.

2. The method of claim 1, wherein the modifying IC/IS operations comprises at least partly skipping the IC/IS operations during at least a portion of the first subframe.

3. The method of claim 1, wherein the first subframe configuration is one of a downlink subframe, an uplink subframe or a special subframe, and the neighboring subframe configuration is one of the downlink subframe, the uplink subframe or the special subframe.

4. The method of claim 1, further comprising:
receiving information from the base station identifying at least a portion of one or more subframes in which the IC/IS operations are to be at least partly skipped.

5. The method of claim 4, wherein the information comprises an indication of a time-division duplex (TDD) uplink/downlink (UL/DL) configuration for the neighboring base station and a subset of subframes containing interference is determined based on the TDD UL/DL configuration for the neighboring base station.

6. The method of claim 1, wherein the determining that the neighboring base station is operating according to the neighboring subframe configuration comprises:
detecting whether a neighboring subframe for the neighboring base station, that at least partly overlaps the first subframe, comprises one or more of a downlink transmission or an uplink transmission.

7. The method of claim 6, wherein the detecting comprises:
determining whether the neighboring subframe for the neighboring base station comprises one or both of a downlink transmission and an uplink transmission based at least in part on information associated with the reference signal.

8. The method of claim 6, further comprising:
determining the neighboring subframe configuration based at least in part on a resource block of the neighboring base station and an assumption that all transmitted subframes of the neighboring base station are consistent with the information in the resource block.

9. The method of claim 1, further comprising:
receiving from the base station the third subframe of the third subframe configuration, the third subframe comprising a first special subframe (SSF); and
determining that the neighboring base station is operating according to the fourth subframe configuration during the third subframe.

10. The method of claim 9, wherein the modifying IC/IS operations comprises at least partly skipping the IC/IS operations during at least a portion of the third subframe for the first SSF.

11. A non-transitory computer-readable medium, comprising code executable by a processor of a user equipment (UE) for:
    receiving from a base station a first subframe of a first subframe configuration;
    receiving a reference signal of a neighboring base station;
    determining that a neighboring base station is operating according to a neighboring subframe configuration during the first subframe based on information associated with the received reference signal, the neighboring subframe configuration being different from the first subframe configuration;
    modifying interference cancellation/interference suppression (IC/IS) operations for the first subframe based on the determination that the neighboring base station is operating according to the neighboring subframe configuration during the first subframe; and
    modifying IC/IS operations for a third subframe in response to a third subframe configuration being the same as a fourth subframe configuration.

12. The non-transitory computer-readable medium of claim 11, wherein the code for modifying IC/IS operations comprises code for at least partly skipping the IC/IS operations during at least a portion of the first subframe.

13. The non-transitory computer-readable medium of claim 11, wherein the first subframe configuration is one of a downlink subframe, an uplink subframe or a special subframe, and the neighboring subframe configuration is one of a downlink subframe, an uplink subframe or a special subframe.

14. The non-transitory computer-readable medium of claim 11, further comprising code executable by the processor of the UE for:
    receiving information from the base station identifying at least a portion of one or more subframes in which the IC/IS operations are to be at least partly skipped.

15. The non-transitory computer-readable medium of claim 11, further comprising code executable by the processor of the UE for:
    detecting whether a neighboring subframe for the neighboring base station, that at least partly overlaps the first subframe, comprises one or both of a downlink transmission and an uplink transmission.

16. The non-transitory computer-readable medium of claim 15, wherein the code for detecting further comprises code executable by the processor of the UE for:
    determining whether the neighboring subframe for the neighboring base station comprises one or both of a downlink transmission and an uplink transmission based on information associated with the reference signal.

17. The non-transitory computer-readable medium of claim 15, further comprising:
    determining the neighboring subframe configuration based at least in part on a resource block of the neighboring base station and an assumption that all transmitted subframes of the neighboring base station are consistent with information in the resource block.

18. The non-transitory computer-readable medium of claim 11, further comprising code executable by the processor of the UE for:
    receiving from the base station the third subframe of the third subframe configuration, the third subframe comprising a first special subframe (SSF); and
    determining that the neighboring base station is operating according to the fourth subframe configuration during the third subframe.

19. The non-transitory computer-readable medium of claim 18, wherein the modifying IC/IS operations comprises at least partly skipping the IC/IS operations during at least a portion of the third subframe for the first SSF.

20. A device for wireless communication, comprising:
    a processor; and
    a memory in electronic communication with the processor, the memory embodying instructions, the instructions being executable by the processor to:
        receive from a base station a first subframe of a first subframe configuration;
        receive a reference signal of a neighboring base station;
        determine that a neighboring base station is operating according to a neighboring subframe configuration during the first subframe based on information associated with the received reference signal, the neighboring subframe configuration being different from the first subframe configuration;
        modify interference cancellation/interference suppression (IC/IS) operations for the first subframe based on the determination that the neighboring base station is operating according to the neighboring subframe configuration during the first subframe; and
        modify IC/IS operations for a third subframe in response to a third subframe configuration being the same as a fourth subframe configuration.

21. The device of claim 20, wherein the modifying IC/IS operations comprises at least partly skipping the IC/IS operations during at least a portion of the first subframe.

22. The device of claim 20, wherein the first subframe configuration is one of a downlink subframe, an uplink subframe or a special subframe, and the neighboring subframe configuration is one of a downlink subframe, an uplink subframe or a special subframe.

23. The device of claim 20, wherein the instructions are further executable to:
    receive information from the base station identifying at least a portion of one or more subframes in which the IC/IS operations are to be at least partly skipped.

24. The device of claim 23, wherein the information comprises an indication of a time-division duplex (TDD) uplink/downlink (UL/DL) configuration for the neighboring base station and a subset of subframes containing interference is determined based on the TDD UL/DL configuration for the neighboring base station.

25. The device of claim 20, wherein the instructions to determine that the neighboring base station is operating according to the neighboring subframe configuration include instructions to:
    detect whether a neighboring subframe for the neighboring base station, that at least partly overlaps the first subframe, comprises one or more of a downlink transmission or an uplink transmission.

26. The device of claim 25, wherein the instructions to detect include instructions to:
    determine whether the neighboring subframe for the neighboring base station comprises one or both of a downlink transmission and an uplink transmission based on information associated with the reference signal.

27. The device of claim 25, wherein the instructions are further executable to:
    determine the neighboring subframe configuration based at least in part on a resource block of the neighboring base station and an assumption that all transmitted subframes of the neighboring base station are consistent with information in the resource block.

28. A method for wireless communications performed by a base station, comprising:
  identifying a first subframe configuration for a first subframe associated with a user equipment (UE);
  determining that a neighboring base station is operating according to a neighboring subframe configuration during the first subframe, the neighboring subframe configuration being different from the first subframe configuration;
  transmitting information to the UE identifying the first subframe for IC/IS modification, the information comprising a bitmap identifying a subset of subframes; and
  modifying interference cancellation/interference suppression (IC/IS) operations for the first subframe based on the determination that the neighboring base station is operating according to the neighboring subframe configuration during the first subframe, wherein modifying IC/IS operations comprises at least partly skipping the IC/IS operations during at least a portion of the first subframe.

* * * * *